United States Patent [19]
White

[11] Patent Number: 5,706,932
[45] Date of Patent: Jan. 13, 1998

[54] APPARATUS AND METHOD OF CLEANING CONVEYOR BELTS

[76] Inventor: Robert G. White, 147 S. Bay Ave., Brightwaters, N.Y. 11718

[21] Appl. No.: 622,819

[22] Filed: Mar. 27, 1996

[51] Int. Cl.$^6$ ................................................ B65G 45/00
[52] U.S. Cl. ................................. 198/495; 15/302
[58] Field of Search ............................. 195/495; 15/302

[56] References Cited

U.S. PATENT DOCUMENTS

| | | | |
|---|---|---|---|
| 2,266,309 | 12/1941 | Cohen . | |
| 3,017,986 | 1/1962 | Ackles . | |
| 3,815,728 | 6/1974 | Vaughan . | |
| 4,051,211 | 9/1977 | Beser et al. | 198/495 X |
| 4,777,972 | 10/1988 | Adam . | |
| 5,117,967 | 6/1992 | Morrow et al. . | |
| 5,333,724 | 8/1994 | Wingfield et al. . | |
| 5,598,915 | 2/1997 | Malmberg et al. | 198/495 |

FOREIGN PATENT DOCUMENTS

| | | |
|---|---|---|
| 2630413 | 10/1989 | France . |
| 1199723 | 12/1985 | U.S.S.R. . |
| 1705205 | 1/1992 | U.S.S.R. . |

OTHER PUBLICATIONS

Northern Catalog/Cleaners and Pumps, pp. 123, middle col. (Jan. 1996).

*Primary Examiner*—D. Glenn Dayoan
*Attorney, Agent, or Firm*—Hoffman & Baron, LLP

[57] ABSTRACT

A device for cleaning a conveyor belt, whereby the conveyor belt has at least one surface and the device is responsive to a source of cleaning fluid and a source of pressurized air and is electrically powered by a source of electric power, includes a washer head assembly. The washer head assembly is removably mounted above the conveyor belt and includes a dual spray arm member for spraying the cleaning fluid onto the at least one surface of the conveyor belt. The washer head assembly also includes an air-driven motor for rotating the dual spray arm member, whereby the air-driven motor is responsive to the source of pressurized air and is operatively coupled to the dual spray arm member. Further, the washer head assembly includes a selectively adjustable air flow control valve for adjusting the rotational speed of the dual spray arm member. The conveyor belt cleaning device also includes cart-based equipment which is transported on a portable cart. The cart-based equipment includes an electric motor and a pressure pump for pressurizing the cleaning fluid prior to the cleaning fluid being supplied to the dual spray arm member of the washer head assembly. The cart-based equipment also includes a regulator assembly for controlling the pressurized air prior to the pressurized air being supplied to the air-driven motor of the washer head assembly. The washer head assembly and the cart-based equipment are interconnected by flexible hoses.

46 Claims, 7 Drawing Sheets

5,706,932

APPARATUS AND METHOD OF CLEANING CONVEYOR BELTS

BACKGROUND OF THE INVENTION

1. Field of the Invention

The present invention relates to apparatus and methods of cleaning conveyor belts and the like, and more particularly relates to apparatus and methods of cleaning conveyor belts used in the manufacture of baked goods and similar food products.

2. Description of the Prior Art

In the manufacturing process of baked goods and similar food products, the use of conveyor belts to transport the goods from one manufacturing process to another is very common. It is to be appreciated that during the transportation of baked goods on such conveyor belts, the goods tend to impart foreign particles (e.g., shortening, icing, loose food particles, etc.) on the belts. These foreign particles present not only a sanitary concern for baked good manufacturers, but an ingredient cross-contamination concern as well. Particularly, it is undesirable, from the point of view of the consumer, for one type of baked good to contain particles from another type of baked good.

To avoid these sanitary and cross-contamination concerns, periodic cleaning of the conveyor belts must be performed. Various methods have been employed in the past to clean conveyor belts, one of which has been the manual use of a waterhose by manufacturing or maintenance personnel. However, such a cleaning method has proven to be time consuming, wasteful and, generally, quite ineffective at achieving the desired result. Specifically, in a baked goods manufacturing facility that employs many conveyor belts, it is not uncommon to have at least one worker dedicated to cleaning the conveyor belts. In addition to the considerable labor required, the manual use of a waterhose to clean the belts consumes a large amount of water, much of which is wasted. For example, such a manual cleaning method may consume more than fifty gallons of water per minute. Unfortunately, a great deal of this water is wasted when either the worker handling the hose misdirects the stream or inadvertently rewashes a previously washed area. Accordingly, it is not difficult to envision that such a manual method of cleaning the belts, where the worker may fail to wash each portion of the belt with the same thorough consistency, would generally be ineffective.

Other prior art methods have been employed to clean conveyor belts, such as brushing or soaking methods; however, each of these methods suffer from disadvantageous limitations. For instance, while the brushing method has failed to thoroughly clean belts because it is generally unable to reach all the crevices and recesses of the belts or the multiple surfaces of certain types of conveyor belts, the soaking method has similarly failed because it is much too time consuming to allow a belt soak in water as a method of cleaning. Still other methods have employed spray cleaning, some of which have even been portable; however, they too have proven ineffective due to cumbersome design and/or insufficient cleaning capacity.

OBJECTS AND SUMMARY OF THE INVENTION

It is an object of the present invention to provide apparatus for cleaning conveyor belts which overcomes the disadvantages of existing conveyor belt cleaning apparatus.

It is another object of the present invention to provide apparatus for cleaning conveyor belts which provides an efficient consumption of cleaning fluid.

It is yet another object of the present invention to provide apparatus for cleaning conveyor belts which provides rotational speed adjustment capability.

It is a further object of the present invention to provide apparatus for cleaning conveyor belts which is portable.

It is still a further object of the present invention to provide apparatus for cleaning conveyor belts which provides operational safety features such as, for example, emergency shutdown capability.

It is yet another object of the present invention to provide apparatus for cleaning conveyor belts which provides the user with a portable, maneuverable washer head assembly allowing for repositioning among different conveyor belts which require cleaning.

It is still a further object of the present invention to provide apparatus for cleaning conveyor belts which provides the user with a mobile cart for transporting equipment associated with the apparatus.

It is yet another object of the present invention to provide a method of cleaning conveyor belts which overcomes the disadvantages of existing cleaning methods.

In accordance with one form of the present invention, apparatus for cleaning a conveyor belt having at least one surface, whereby the apparatus is responsive to a source of cleaning fluid and a source of pressurized air and is electrically powered by a source of electric power, includes a washer head assembly. The washer head assembly is removably mounted above the conveyor belt and, itself, includes means for spraying the cleaning fluid onto the at least one surface of the conveyor belt, the spraying means being responsive to the source of cleaning fluid. The washer head assembly also includes means for rotating the spraying means, the rotating means being operatively coupled to the spraying means and being responsive to the source of pressurized air. The rotating means of the washer head assembly further includes means for selectively adjusting a rotational speed associated with the spraying means in order to vary the cleaning efficiency of the apparatus to be commensurate with the degree with which the conveyor belt is soiled.

The apparatus for cleaning a conveyor belt also includes cart-based equipment. The cart-based equipment, itself, includes means for pressurizing the cleaning fluid prior to the cleaning fluid being supplied to the spraying means of the washer head assembly, the pressurizing means being releasably coupled to the source of cleaning fluid. The cart-based equipment also includes means for controlling the pressurized air prior to the pressurized air being supplied to the rotating means of the washer head assembly, the controlling means being releasably coupled to the source of the pressurized air. Further, the cart-based equipment includes first coupling means. The first coupling means releasably couples the pressurizing means of the cart-based equipment and the spraying means of the washer head assembly. Still further, the cart-based equipment includes second coupling means. The second coupling means releasably couples the controlling means of the cart-based equipment and the rotating means of the washer head assembly. Further, the apparatus for cleaning a conveyor belt includes a cart. The cart portably supports the cart-based equipment.

The rotating means of the washer head assembly preferably includes an air-driven motor. The air-driven motor is operatively coupled to the second coupling means of the cart-based equipment and is driven by the source of pressurized air which passes through the controlling means and the second coupling means of the cart-based equipment. Correspondingly, the air-driven motor provides a rotational driving force. Further, the rotating means includes means for translating the rotational driving force provided by the air-driven motor to the spraying means of the washer head assembly. The translating means is connected between the air-driven motor and the spraying means.

The translating means preferably includes a first sprocket, a second sprocket and a chain. The first sprocket is connected to the air-driven motor, while the second sprocket is connected to the spraying means of the washer head assembly. Further, the chain is coupled between the first and second sprockets, whereby the rotational driving force of the air-driven motor causes the first sprocket to rotate, in turn rotating the chain, in turn rotating the second sprocket, in turn causing the spraying means of the washer head assembly to correspondingly rotate. Further, the translating means preferably includes a chain tensioner. The chain tensioner engages the chain thereby maintaining a tension in the chain as the chain rotates around the first and second sprockets. It is to be appreciated that the chain tensioner serves to keep the chain taut in order to maximize the translation of the rotational driving force from the air-driven motor to the spraying means of the washer head assembly.

Still further, the rotating means of the washer head assembly preferably includes an intermediate coupler. The intermediate coupler includes a first port and a second port and is fixedly mounted on the washer head assembly. Also, the rotating means preferably includes an intermediate hose. The intermediate hose includes a first end and a second end, whereby the first end is releasably coupled to the air-driven motor and the second end is releasably coupled to the first port of the intermediate coupler. Still further, the second coupling means is releasably coupled to the second port of the intermediate coupler. It is to be appreciated that the intermediate coupler and intermediate hose are employed to substantially reduce the coupling stress on the air-driven motor.

As previously mentioned, and as will be described in greater detail later, the rotational speed adjusting means of the rotating means of the washer head assembly includes a selectively adjustable speed control device. The speed control device is mounted on the rotating means and controls a rotational speed associated with the spraying means. In a preferred embodiment, the speed control device is an air flow control valve mounted in line with the air-driven motor.

In addition, the washer head assembly preferably includes means for automatically disconnecting the electric power to the conveyor belt cleaning apparatus. The washer head assembly automatic power disconnect means is mounted on the washer head assembly and is responsive to the washer head assembly being situated in either a level position or an unlevel position. In a preferred embodiment, the automatic power disconnect means of the washer head assembly includes a mercury tilt-level sensor. The operation of the sensor will be described in greater detail later in the detailed description.

The spraying means of the washer head assembly preferably includes a cleaning fluid union. The union is operatively coupled to the first coupling means of the cart-based equipment and allows the pressurized cleaning fluid to pass therethrough. It is to be appreciated that the conveyor belt cleaning apparatus of the present invention may utilize water as the cleaning fluid used during the cleaning operation and/or any other cleaning fluid known in the art. Further, the spraying means preferably includes at least one spray arm member. The at least one spray arm member is coupled to the cleaning fluid union and has at least one nozzle attached thereto. The at least one nozzle discharges the pressurized cleaning fluid, provided through the cleaning fluid union and through the at least one spray arm member to the at least one nozzle, in the direction of the at least one surface of the conveyor belt. Accordingly, the cleaning fluid removes any foreign particles on the at least one surface of the conveyor belt.

It is to be appreciated that the at least one nozzle of the at least one spray arm member preferably has a fixed spray angle range of between approximately 15 degrees and approximately 20 degrees. However, it is to be appreciated that the direction of spraying of the at least one nozzle with respect to the at least one surface of the conveyor belt, may be selectively adjustable. This may preferably be accomplished by adjustably mounting the at least one nozzle on the at least one spray arm member.

Further, the spraying means of the washer head assembly preferably includes an intermediate coupler. The intermediate coupler has a first port and a second port and is fixedly mounted on the washer head assembly. The spraying means also preferably includes an intermediate hose. The intermediate hose has a first end and a second end, whereby the first end is releasably coupled to the cleaning fluid union and the second end is releasably coupled to the first port of the intermediate coupler. Further, the first coupling means is releasably coupled to the second port of the intermediate coupler in order to substantially reduce coupling stress on the cleaning fluid union.

Further, an apparatus for cleaning a conveyor belt, formed in accordance with the present invention, preferably includes a control panel assembly which controls the operation of the apparatus. The control panel assembly, itself, preferably includes means for selectively applying the electric power to the apparatus, the power applying means being operatively connected to the source of the electric power. In a preferred embodiment, the power applying means includes at least one disconnect switch. The control panel assembly also preferably includes means for selectively starting the cleaning operation of the apparatus, the selective starting means being operatively connected to the source of the electric power. Again, in a preferred embodiment, the selective starting means includes a pushbutton switch. Still further, the control panel assembly preferably includes means for selectively stopping the cleaning operation of the apparatus, the selective stopping means being operatively connected to the source of electric power. Similar to the selective starting means, the selective stopping means, in a preferred embodiment, includes a pushbutton switch. The control panel assembly also preferably includes an indicator which provides an indication that the electric power is applied to the apparatus and that the apparatus is currently operating. The indicator is operatively connected to the source of electric power and, in a preferred embodiment, is a lamp. Accordingly, the lamp is lit when the electric power is applied to the apparatus and the apparatus is currently operating.

The control panel assembly also preferably includes means for selectively setting a maximum operation time, the maximum operation time corresponding to the cleaning operation of the apparatus. The maximum operation time setting means is operatively connected to the source of electric power and, in a preferred embodiment, includes an adjustable operation timer, whereby the adjustable operation timer automatically disconnects the electric power to the apparatus when the maximum operation time has been reached. Still further, the control panel assembly of the conveyor belt cleaning apparatus preferably includes means for automatically disconnecting the electric power to the apparatus, whereby the control panel assembly automatic power disconnect means is responsive to a predefined current leakage level to ground. Also, the automatic power disconnect means of the control panel assembly is operatively connected to the source of electric power. It is to be appreciated that, in a preferred embodiment, the automatic power disconnect means of the control panel assembly includes at least one ground fault detector.

The means for pressurizing the cleaning fluid prior to the cleaning fluid being supplied to the spraying means of the washer head assembly includes an electric motor, the electric motor being operatively connected to the source of electric power. The pressurizing means also preferably includes a pressure pump. The pressure pump is operatively coupled to, and driven by, the electric motor and has at least a first input port and at least a first output port. The at least a first input port is releasably coupled to the source of cleaning fluid, while the at least a first output port is releasably coupled to the first coupling means of the cart-based equipment. It is to be understood that the pressure pump pressurizes the cleaning fluid, as the cleaning fluid passes therethrough, prior to the cleaning fluid being supplied to the spraying means of the washer head assembly. In a preferred embodiment, the pressure pump develops an output pressure of approximately 1500 pounds per square inch (psi). This output pressure, associated with the cleaning fluid delivered to the washer head assembly, is preferably controlled by an output pressure control valve mounted on the pressure pump. The output pressure control valve provides for selective adjustment of the output pressure associated with the cleaning fluid delivered by the pressure pump to the washer head assembly.

Further, the pressure pump preferably includes a high pressure bypass port. The high pressure bypass port allows the cleaning fluid, subsequent to being pressurized by the pressure pump, to be discharged therethrough if, and when, the apparatus experiences at least one of a first plurality of malfunction conditions. It is to be appreciated that the first plurality of malfunction conditions may include obstructions (e.g., such as a clog or a kink) in the first coupling means or similar obstructions at the washer head assembly. In this way, any personnel in the vicinity of the conveyor belt cleaning apparatus at the time of the malfunction are not threatened by the possibility of a stream of pressurized cleaning fluid being released at the point of the obstruction, or at any connection between the pressure pump and the washer head assembly, should the abnormal pressure caused by the malfunction not be relieved.

Still further, the pressure pump preferably includes a low pressure bypass port. The low pressure bypass port allows for the discharge of cleaning fluid from the pressure pump, prior to the cleaning fluid being pressurized, when the apparatus experiences at least one of a second plurality of malfunction conditions. The second plurality of malfunction conditions may include any of the conditions which would cause the conveyor belt cleaning apparatus to shut down. It is to be appreciated that the first plurality of malfunction conditions and the second plurality of malfunction conditions will be described in greater detail in the context of the detailed description of the preferred embodiment of the present invention. The pressure pump also preferably includes a water pressure switch that, as will be described later in detail, prevents the apparatus from operating if the source is not supplying cleaning fluid. Lastly, the pressure pump preferably includes a filter, the filter being located between the input water hose and the at least first input port of the pressure pump. The filter prevents foreign particles, present in the cleaning fluid supplied by the source, from entering the pressure pump.

The means for controlling the rotating means of the conveyor belt cleaning apparatus preferably includes a regulator assembly. The regulator assembly has at least one input port and at least one output port, the at least one input port being releasably coupled to the source of pressurized air and the at least one output port being releasably coupled to the second coupling means of the cart-based equipment. It is to be understood that the regulator assembly is responsive to the source of electric power and functions in either an operating state or a non-operating state. The regulator assembly is in the operating state when electric power is provided thereto and, conversely, is in a non-operating state when electric power is not provided thereto. Accordingly, the regulator assembly allows pressurized air to pass therethrough while in the operating state and prevents pressurized air from passing therethrough while in the non-operating state. Still further, the regulator assembly preferably includes a filter. The filter prevents foreign particles, present in the pressurized air supplied by the source, from passing through the regulator assembly to the rotating means of the washer head assembly.

The first coupling means of the cart-based equipment preferably includes a flexible hose. The flexible hose has a first end and a second end and connectors, fitted at each end, for releasably coupling the flexible hose between the pressurizing means and the spraying means. Likewise, the second coupling means of the cart-based equipment also includes a flexible hose. In this case, the flexible hose having a first end and a second end and connectors, fired at each end, is releasably coupled between the controlling means and the rotating means. In a preferred embodiment, the first coupling means is a pressurized waterhose, while the second coupling means is a pressurized airhose.

The cart of the conveyor belt cleaning apparatus preferably includes means for storing the first coupling means, the second coupling means and the washer head assembly, when the apparatus is not in use. Additionally, the washer head assembly of the conveyor belt cleaning apparatus preferably includes a protective cowl. The cowl, as will be described in greater detail later, allows cleaning fluid to be sprayed out of the bottom opening of the cowl by the spraying means but prevents the cleaning fluid sprayed by the spraying means from being directed in a direction other than towards the at least one surface of the conveyor belt. The washer head assembly also preferably includes a pair of mounting brackets. The pair of mounting brackets are fixedly attached to the washer head assembly and engage the frame of the conveyor belt such that the washer head assembly may be removably mounted thereabove while allowing the conveyor belt to move beneath the washer head assembly. Lastly, while the above embodiments of the present invention have been described as generally utilizing a cleaning fluid, it is to be appreciated that in a preferred embodiment, the cleaning fluid may preferably be water or any other type of cleaning fluid known in the art.

In accordance with a method of the present invention for cleaning a conveyor belt, the conveyor belt has at least one surface and the method utilizes a conveyor belt cleaning apparatus which is responsive to a source of cleaning fluid and a source of pressurized air and the apparatus is electrically powered by a source of electric power. Further, the apparatus utilized in the method of the present invention includes a washer head assembly, cart-based equipment and a cart. Still further, the washer head assembly utilized in the method of the present invention includes means for spraying the cleaning fluid on to the at least one surface of the conveyor belt and also includes means for rotating the spraying means. The cart-based equipment includes means for pressurizing the cleaning fluid prior to the cleaning fluid being supplied to the spraying means. The cart portably transports the cart-based equipment, while the washer head assembly is removably mounted above the conveyor belt. The method includes the step of supplying cleaning fluid to the pressurizing means of the cart-based equipment. Next, the method includes pressurizing the cleaning fluid via the pressurizing means of the cart-based equipment and, then, supplying the pressurized cleaning fluid to the spraying means of the washer head assembly.

In addition, the method includes supplying pressurized air to the rotating means of the washer head assembly in order to generate a rotational driving force and, then, translating the rotational driving force of the rotating means to the spraying means of the washer head assembly thereby causing the spraying means to correspondingly rotate. Next, the method includes spraying the pressurized cleaning fluid onto the at least one surface of the conveyor belt as the conveyor belt moves therebeneath. Still further, the method includes adjusting the rotational speed of the spraying means in order to vary the cleaning efficiency of the apparatus to be commensurate with the degree with which the conveyor belt is soiled. The method of the present invention also preferably includes automatically disconnecting the electric power to the conveyor belt cleaning apparatus if the washer head assembly, mounted above the conveyor belt, becomes unlevel. Also, as discussed above, the cleaning fluid utilized by the method of the present invention may preferably be water.

Previously, various prior art methods and devices for attempting to clean conveyor belts utilized in manufacturing processes have been employed. However, these prior art methods and devices have provided ineffective results. As previously mentioned, the manual method of using a water-hose to attempt to clean a soiled conveyor belt has proven to be time consuming and wasteful. It was not uncommon for at least one manufacturing facility worker to be dedicated to cleaning conveyor belts. In addition, beyond the disadvantageous labor requirements, such a manual cleaning method consumed more than 50 gallons of water per minute. Further, a great deal of this large quantity of water was wasted when either the worker handling the hose misdirected the stream or inadvertently rewashed a previously-washed area.

Likewise, prior art devices used to clean conveyor belts have also provided unsatisfactory results. For instance, prior art devices utilizing a brushing method tended to be unable to reach all of the crevices and recesses of the conveyor belts or, for that matter, the multiple surfaces which a conveyor belt may include. In addition, prior art devices utilizing a soaking method have been inefficient in that such devices take up too much time in cleaning the conveyor belts. Still further, prior art devices utilizing a spraying method, even those of the portable variety, have proven ineffective due to several disadvantages associated with their design. For example, such prior art portable spray cleaning devices have utilized cumbersome designs and have also suffered from insufficient cleaning capacity. Significantly, these prior art devices have also been inefficient because of their failure to provide adequate means for maintenance personnel to control and adjust the cleaning operation during the course of the operation.

Surprisingly, an apparatus for cleaning conveyor belts, formed in accordance with the present invention, overcomes the disadvantages of existing methods and devices for cleaning conveyor belts. It is to be further appreciated that the conveyor belt cleaning apparatus of the present invention provides maintenance personnel in a manufacturing facility, such as a baked goods manufacturing facility, with a mobile cart for transporting equipment associated with the apparatus and a portable, maneuverable washer head assembly which may be repositioned among different conveyor belts which require cleaning. It is to be appreciated that the conveyor belt cleaning apparatus of the present invention may substantially provide a tenfold improvement in the consumption of cleaning fluid required to perform the cleaning operation as compared to the prior art methods and devices. Also, the conveyor belt cleaning apparatus of the present invention provides an adjustment capability, not available with existing methods and devices, which allows for maintenance personnel to adjust the speed with which the spraying means of the washer head assembly rotates. In this way, it is to be understood that the rotational speed of the washer head assembly is advantageously adjusted in order to vary the cleaning efficiency of the apparatus to be commensurate with the degree with which the conveyor belt is soiled, thus, maximizing the cleaning operation. In addition to the novel adjustment and efficiency features of the conveyor belt cleaning apparatus of the present invention, the apparatus also provides operational safety features. Such safety features, which will be described in greater detail later, include emergency shut down capability in the event that a malfunction occurs during the usage of the conveyor belt cleaning apparatus.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
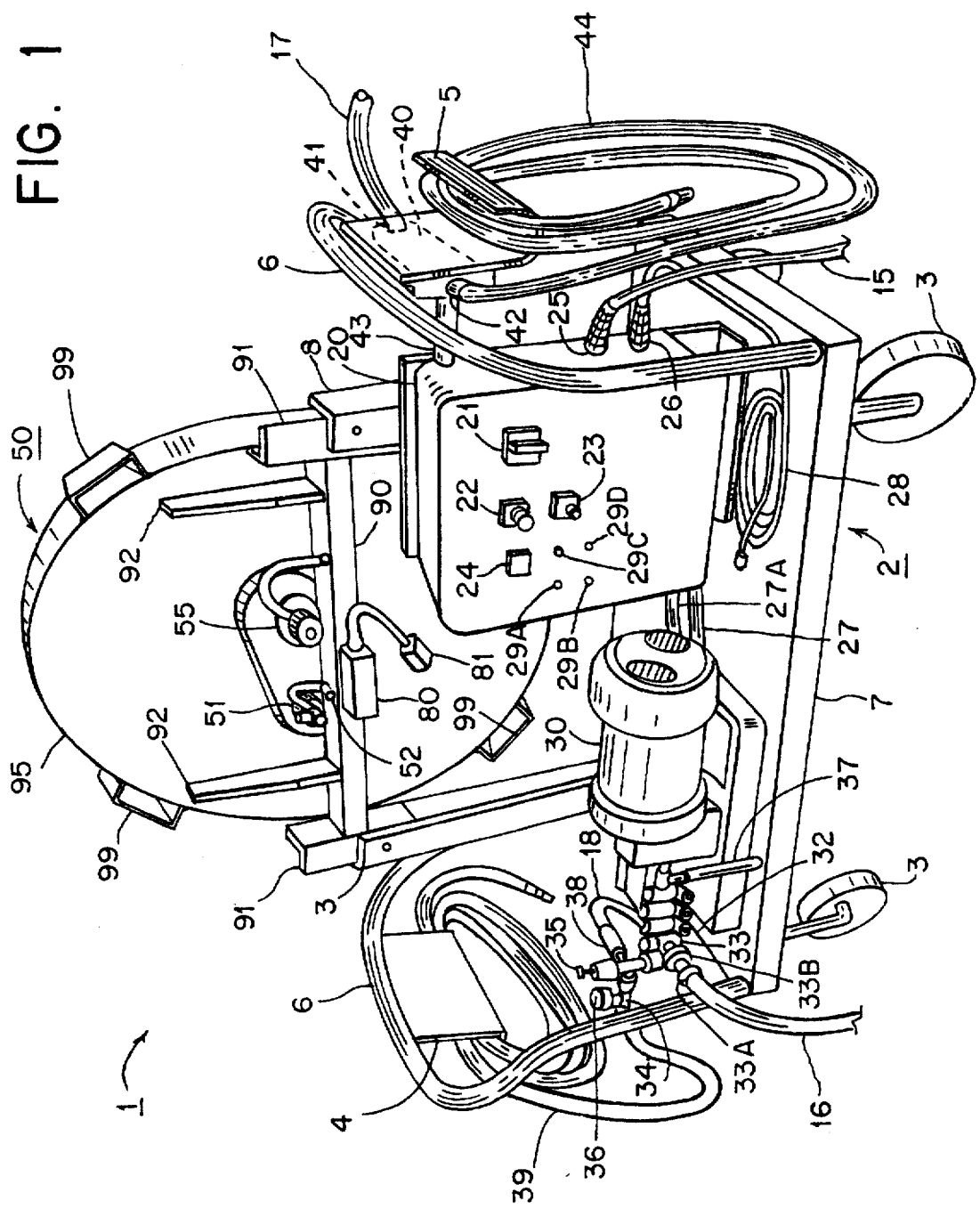
FIG. 1 is a side perspective view of one embodiment of an apparatus for cleaning a conveyor belt, in a non-operating position, formed in accordance with the present invention.

Referring initially to FIGS. 1–4, a conveyor belt cleaning apparatus 1 formed in accordance with the present invention basically includes a portable cart 2, cart-based equipment including a control panel assembly 20, an electric motor 30, a pressure pump 32, a pressurized air flow regulator assembly 40 and a washer head assembly 50. As will be discussed in greater detail, the conveyor belt cleaning apparatus 1 is preferably used to clean conveyor belts utilized in the manufacturing process of baked goods and similar food products. However, it should be appreciated that the apparatus 1 is not limited to the cleaning of conveyor belts used in the baking industry but, rather, may also be utilized in any industry or manufacturing process which generally makes use of conveyor belts.

Figure 2:
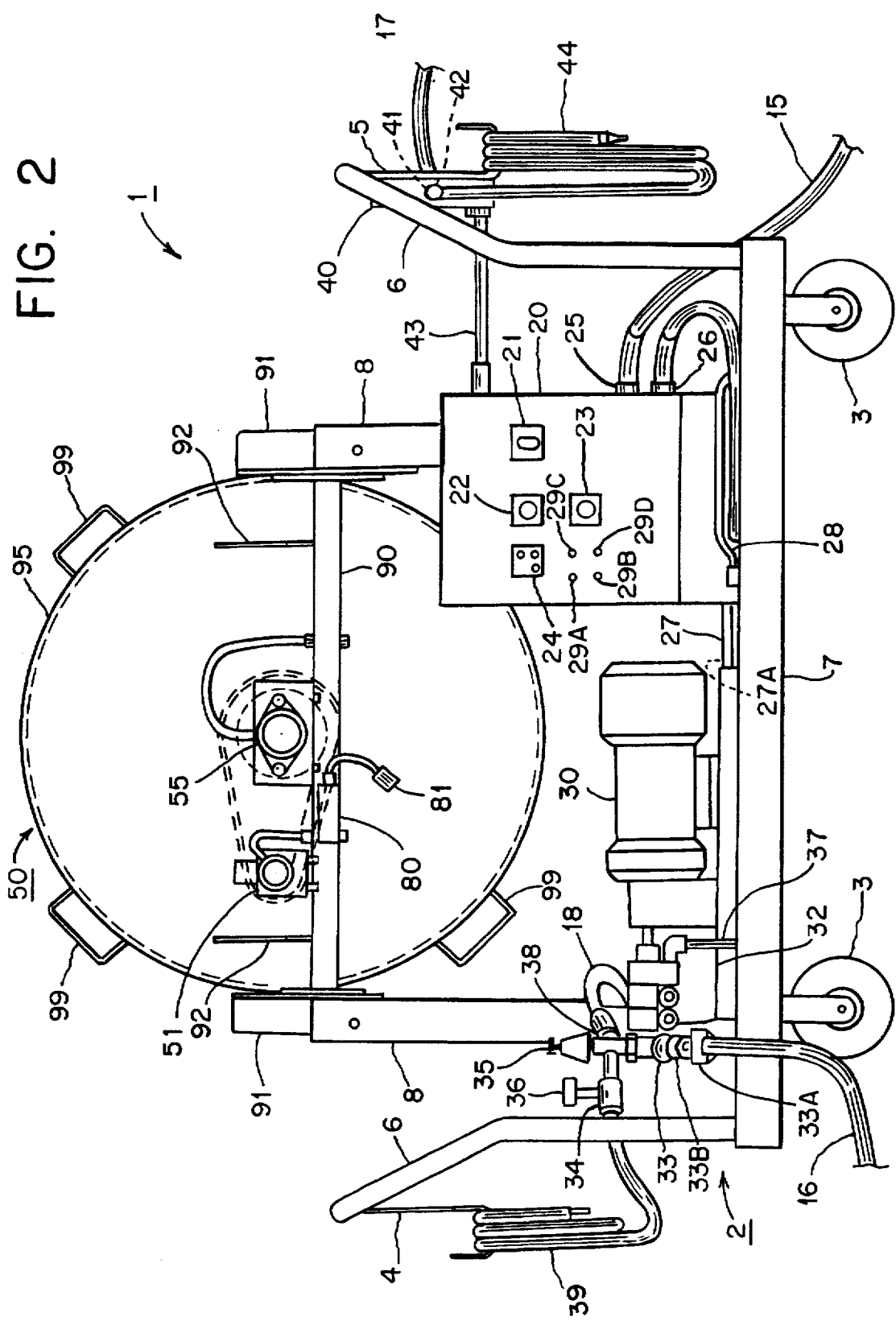
FIG. 2 is a side elevation view of one embodiment of an apparatus for cleaning a conveyor belt, in a non-operating position, formed in accordance with the present invention.
Figure 3:
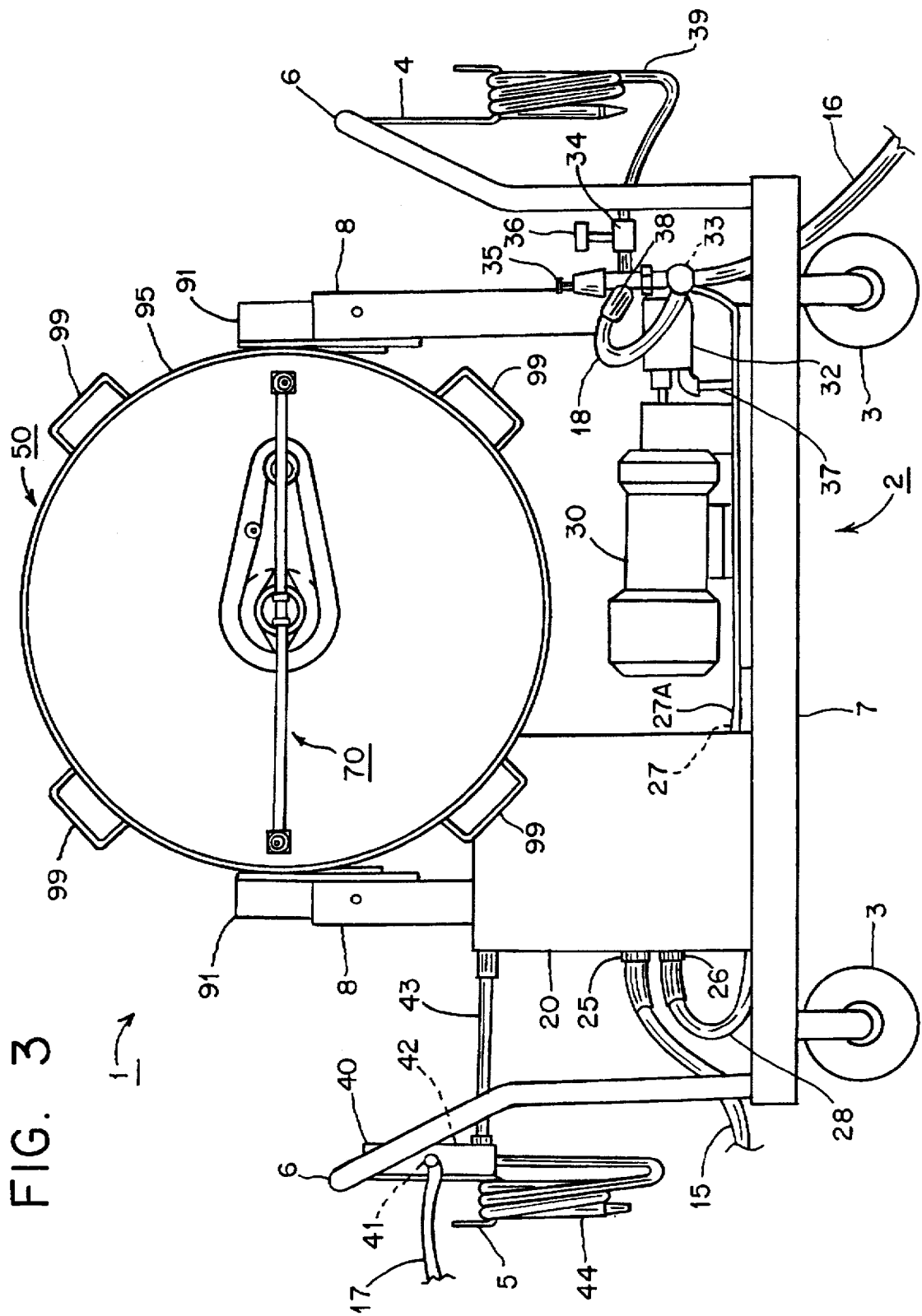
FIG. 3 is an opposite side elevation view of one embodiment of an apparatus for cleaning a conveyor belt, in a non-operating position, formed in accordance with the present invention.
Figure 4:
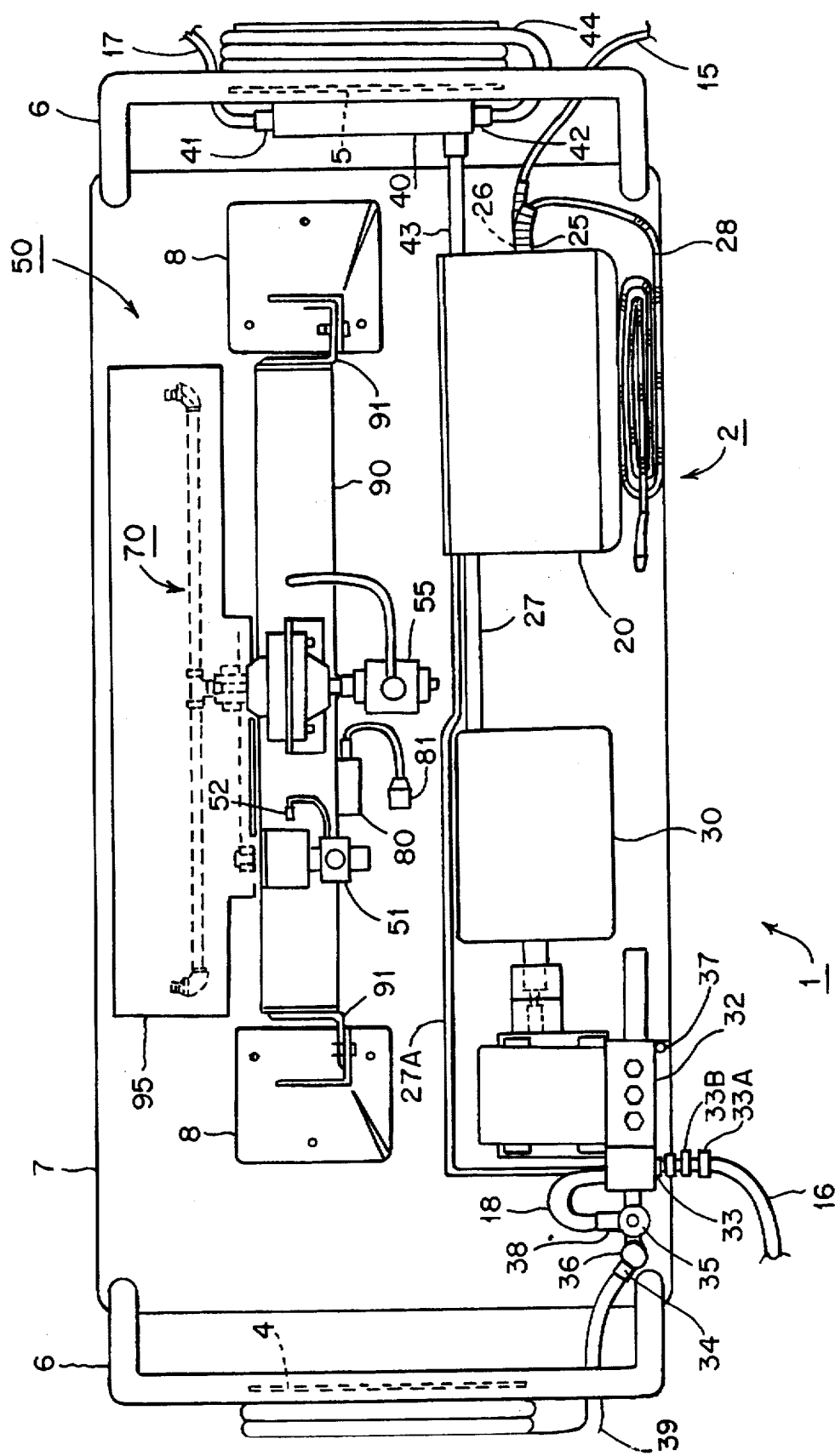
FIG. 4 is a top plan view of one embodiment of an apparatus for cleaning a conveyor belt, in a non-operating position, formed in accordance with the present invention.

The conveyor belt cleaning apparatus 1 is illustrated in a non-operating position in FIGS. 1–4. Specifically, FIG. 1 is a side perspective view of the apparatus 1, FIG. 2 is a side elevation view of the apparatus 1, FIG. 3 is an opposite side elevation view (in relation to the side elevation view of FIG. 1) of the apparatus 1 and FIG. 4 is a top plan view of the apparatus 1. The structural configuration, including component layout and component interconnection, of the preferred embodiment of the conveyor belt cleaning apparatus 1 will now be described in the context of FIGS. 1–4, followed by a similar description of the washer head assembly 50 as illustrated FIGS. 5 and 6. The operation of the conveyor belt cleaning apparatus 1 will then be described in the context of FIG. 7.

The portable cart 2 of the apparatus 1 includes a base 7, wheels 3, cart handles 6, a first storing bracket 4, a second storing bracket 5 and washer head assembly storing brackets 8. In a preferred embodiment of the present invention, the cart 2 includes four wheels, one at each corner of the base 7; however, it is to be appreciated that a greater or lesser number of wheels may be employed, depending on the shape of the cart, so long as the cart and the equipment thereupon remain mobile. The cart handles 6 are located at opposite ends of the cart and are attached to the base. The cart handles 6 provide a safe and convenient place for maintenance personnel to grip the cart 2 in order to push or pull the apparatus 1 between various conveyor belt locations where cleaning is required. Still further, the cart 2 includes a first storing bracket 4 and a second storing bracket 5. The storing brackets, 4 and 5, are respectively mounted, at opposite ends of the cart with respect to one another, to the cart handles 6. As will be discussed in detail later, the storing brackets, 4 and 5, serve as a place to respectively store the pressurized waterhose 39 and the pressurized airhose 44 when the apparatus 1 is not in use. Preferably, the pressurized waterhose 39 is stored on storing bracket 4, while the pressurized airhose 44 is stored on storing bracket 5. In addition, the cart 2 includes washer head assembly storing brackets 8. The storing brackets 8 are mounted to the base 7 of the cart 2 and provide a storage position for the washer head assembly 50 when the apparatus 1 is not in use.

Further, due to the weight of the equipment that is carried on the cart 2 and the need to transport the apparatus 1 between different rooms within the manufacturing plant, one preferred embodiment of the cart 2 includes wide base wheels measuring approximately 8 inches in diameter and an overall width of the cart (measured from side to side) of approximately 30 inches and a length of approximately 60 inches. Such a cart provides a stabile base for the equipment and allows maintenance personnel to move the apparatus through standard doorways.

The equipment that is mounted on the cart 2, hereinafter referred to as the cart-based equipment, includes the following major components: a control panel assembly 20, an electric motor 30, a pressure pump 32, a pressurized waterhose 39, a pressurized air flow regulator assembly 40, a pressurized airhose 44 and a tilt-level sensor cable 28. It should be understood that while the washer head assembly 50 is shown resting on the cart 2 in FIGS. 1–4, the washer head assembly 50 is only stored on the cart 2 when not in use and, therefore, is not otherwise considered part of the cart-based equipment.

The control panel assembly 20 of the cart-based equipment, in effect, controls the operation of the apparatus 1. Specifically, the control panel assembly 20 includes a facility input power connector 25 to which a facility input power cable 15 is releasably connected. It is to be appreciated that the facility input power cable 15, which is not an integral component of the present invention, provides the apparatus with the electric power necessary to perform the cleaning operation. In a preferred embodiment, the electric power provided by the manufacturing facility is a standard three phase 230 VAC/15 A electrical service. It is to be appreciated that while input electric power is provided by the manufacturing facility, it is within the scope of the present invention to include an integral self-generating source of electric power which may be mounted on the cart 2 as part of the cart-based equipment. Such a self-generating source of electric power may be in the form of an electric generator which would provide electric power to the apparatus, independent of the manufacturing facility.

Further, the control panel assembly 20 includes an apparatus power disconnect switch 21. The power disconnect switch 21 is electrically connected to the input power connector 25 and controls the application of the input electric power from the facility to the apparatus 1. When the power disconnect switch 21 is in an "on" position, electric power is available to be applied to the components of the apparatus 1. Conversely, when the switch 21 is in an "off" position, electric power is not available to the components of the apparatus 1.

Still further, the control panel assembly 20 includes a lighted start pushbutton switch 22. The lighted start pushbutton switch 22 is operatively connected to the input power disconnect switch 21. In other words, the lighted start pushbutton switch 22 must be depressed by maintenance personnel in order to apply electric power from the input power disconnect switch 21 to the components of the apparatus 1 which require electric power, thus, beginning the cleaning operation of the apparatus 1. It is to be appreciated that any conventional means for controlling the application of electric power from the input power disconnect switch 21 to the components of the apparatus 1 may be employed. For instance, the lighted start pushbutton switch 22 may actuate an electromechanical relay (not shown), located in the control panel assembly 20, whose contacts are located serially between the input power disconnect switch 21 and the components of the apparatus 1, whereby depressing the pushbutton switch 22 causes the contacts of the relay to close thereby applying the input electric power to the components of the apparatus 1. In addition, in a preferred embodiment, the pushbutton switch 22 includes a lamp, whereby the lamp is operatively connected to the electric power and is lit when the pushbutton switch is depressed, indicating to maintenance personnel not only that the disconnect switch 21 is in the "on" position but also that the start pushbutton has been depressed thereby starting the cleaning operation of the apparatus 1.

Similarly, the control panel assembly 20 also includes a stop pushbutton switch 23. The stop pushbutton switch 23 is operatively connected to the input power disconnect switch 21 in a similar functional manner as the lighted start pushbutton switch 22, described above. The stop pushbutton switch 23 provides the maintenance personnel with the ability to stop the operation of the apparatus 1 once operation has begun. For instance, the stop pushbutton switch 23 deactuates the contacts of the electromechanical relay that were actuated by the start pushbutton switch 22, thereby disabling the application of electric power from the input power disconnect switch 21 to the components of the apparatus 1.

Still further, the control panel assembly 20 also includes an adjustable operation timer 24. The timer 24 is also operatively connected to the input power disconnect switch 21 and provides for setting a maximum operation time for the apparatus to perform its cleaning operation. In effect, the timer 24 automatically performs the function that the stop pushbutton switch 23 manually performs. In other words, maintenance personnel may set a maximum operation time at the timer 24 to a desired predefined operation time. In a preferred embodiment, a keypad is provided on the timer 24 for setting the maximum operation time. Then, maintenance personnel may begin the cleaning operation of the apparatus 1 by depressing the start pushbutton switch 22, as discussed above. Accordingly, once the timer 24 is set and the start pushbutton switch 22 has been depressed, the timer 24 will begin to count down until such time as the timer 24 reaches the maximum operation time set by the maintenance personnel (i.e., time out). At that time, the timer 24 will automatically deactuate the contacts of the relay in a similar manner as the stop pushbutton switch 23 described above, thereby stopping the cleaning operation of the apparatus 1.

It is also to be appreciated that in the preferred embodiment of the present invention, the above-described interaction between the input power disconnect switch 21, the lighted start pushbutton switch 22, the stop pushbutton switch 23 and the adjustable operation timer 24 is accomplished by using digital logic circuitry, such as resettable digital flip-flop circuits in order to provide the novel operational features described above.

The control panel assembly 20 also includes a set of diagnostic indicator lights. The indicator lights give maintenance personnel a visual indication of the operating status of the apparatus 1. Specifically, the diagnostic indicator lights include a "POWER ON" light 29A, a "WATER ON" light 29B, a "LEVEL OK" light 29C and a "MOTOR THERMAL SWT OK" light 29D.

In particular, the "POWER ON" light 29A illuminates when the facility input power cable 15 is plugged into the apparatus 1. Further, the "WATER ON" light 29B illuminates when water is being supplied to the apparatus 1 from the facility input waterhose 16. Light 29B is responsive to a water pressure switch 33B, which will be described later with respect to the pressure pump 32. Still further, the "LEVEL OK" light 29C illuminates when the washer head assembly 50 is in a level position. Light 29C is responsive to the tilt-level sensor 80, which will be described later with respect to the washer head assembly 50. Lastly, the "MOTOR THERMAL SWT OK" light 29D illuminates when the electric motor 30 has not overheated. Light 29D is responsive to a thermal overload contact in the electric motor 32, which will be described later.

Accordingly, electric power is distributed from the control panel assembly 20 to the components of the apparatus 1. It is to be appreciated that the electric power required by each component of the apparatus may be different, e.g., different voltage levels, and therefore, it is within the scope of the present invention to provide the necessary electric power, at whatever voltage level necessary, to the individual components. It should be understood that conventional voltage transformers and/or voltage converters may be used to transform and/or convert the electric power source in order to provide the necessary levels to each component of the apparatus 1.

Specifically, electric power is provided by the control panel assembly 20 to the washer head assembly 50 in order to electrically power a tilt-level sensor 80 mounted on the washer head assembly 50, which will be described in detail later. The electric power to the tilt-level sensor 80 is provided by a tilt-level sensor cable 28, which is releasably connected to the tilt-level sensor 80 at one end and a tilt-level sensor cable connector 26, mounted on the control panel assembly 20, at the other end. The connection between the tilt-level sensor cable 28 and the tilt-level sensor cable connector 26 is preferably of the twist-lock variety. Also, electric power is provided to the electric motor 30 via electrical conduit 27, to the water pressure switch 33B via electrical conduit 27A and to the pressurized air flow regulator assembly 40 via electrical conduit 43.

The control panel assembly 20 also includes ground fault detectors (not shown) which will also stop operation of the cleaning operation of the apparatus 1, in a manner similar to that previously described with respect to the stop pushbutton switch 23 and the adjustable operation timer 24, when a predefined current leakage level to ground (e.g., 30 mA) is detected. It is to be appreciated that ground fault protection may be provided at any component of the apparatus 1 which requires the application of electric power, for instance, such as the pressure pump 32.

The cart-based equipment also includes the electric motor 30 and the pressure pump 32. The electric motor 30 and the pressure pump 32 provide the function of pressurizing the cleaning fluid supplied by the facility, prior to the cleaning fluid being supplied to the washer head assembly 50. In a preferred embodiment the cleaning fluid utilized by the apparatus 1 is water; however, it is to be appreciated that the apparatus 1 may also utilize other types of cleaning fluids, for instance, fluids containing detergents and/or other cleaning agents known in the art. Specifically, the pressure pump 32 includes a facility water input port 33, a pressurized water output port 34, an output pressure control valve 35, an output pressure gauge 36, a high pressure bypass port 37 and a low pressure bypass port 38. The electric motor 30, as previously mentioned, is provided with electric power from the control panel assembly 20 via electrical conduit 27. The electric motor 30 is coupled to the pressure pump 32 and generates the driving force necessary to operate the pressure pump 32.

The facility input water port 33 of the pressure pump 32 is releasably coupled to a facility input waterhose 16. The facility input waterhose 16, which is not an integral component of the present invention, provides the apparatus 1 with the requisite supply of water for performing its cleaning operation. Again, as mentioned above, any other conventional cleaning fluid and/or agent may be substituted in place of the water. Further, it is to be appreciated that while the input water supply is preferably provided by the manufacturing facility, it is within the scope of the present invention to include an integral self-contained source of water which may be mounted on the cart 2 as part of the cart-based equipment, or on its own separate portable cart (not shown). Such a self-contained source of water may be in the form of a water tank with sufficient capacity to hold enough water to perform the cleaning operation of the apparatus 1, independent of the manufacturing facility water supply. Further, in a preferred embodiment of the present invention, the facility water input port 33 of the pressure pump 32 includes a filter 33A. The filter 33A is located between the facility input waterhose 16 and the input port 33 and serves to prevent foreign particles, present in the facility water supply, from entering the pressure pump 32. In this way, not only is a filtered (i.e., strained) supply of water used to perform the conveyor belt cleaning operation, but also the pressure pump 32 is protected from internal damage that may occur should a foreign particle enter therein. Still further, the filtering of foreign particles in the water supply substantially reduces the likelihood of a clog occurring in the apparatus 1, a malfunction condition that will be described in greater detail later.

The pressure pump 32 also includes a water pressure switch 33B. The water pressure switch 33B is located between the filter 33A and the input port 33. The water pressure switch 33B detects the presence of the water supply from the facility. It is to be appreciated that because the pressure pump 32 would be damaged if it were to run without any water supply, the water pressure switch 33B automatically shuts down the operation of the apparatus 1 if no water is being supplied by the facility.

Particularly, the control panel assembly 20 of the cart-based equipment provides electric power, in the form of an input water detect signal, to the water pressure switch 33B via the electrical conduit 27A. The water pressure switch 33B provides an interlock function whereby the switch 33B is sensitive to whether or not water is being supplied to the apparatus 1 by the facility. The switch 33B is, in effect, operatively connected to the apparatus power disconnect switch 21 in the same way as are the start pushbutton switch 22, the stop pushbutton switch 23 and the operation timer 24 of the control panel assembly 20, as previously described. In other words, the electromechanical relay (or digital logic circuitry), previously described, in the control panel assembly 20 is responsive to the water pressure switch 33B, that is, the input water detect signal must be present for the relay to operate. Specifically, if the switch 33B detects the presence of water provided by the facility, the input water detect signal provided by the control panel assembly 20 is returned to the relay (or digital logic circuitry) via a return path provided by the electrical conduit 27A. Accordingly, when the detect signal is present, the relay contacts remain closed and electric power is distributed from the apparatus power disconnect switch 21 through the relay contacts to the components of the apparatus 1. However, if the switch 33B does not detect the presence of water provided by the facility (i.e., the facility source has been shut off), then the switch 33B does not return the input water detect signal thereby causing the deactuation of the relay contacts, thus, disabling electric power to the components of the apparatus 1. It is to be appreciated that when the water pressure switch 33B detects the presence of facility water, thereby providing the interlock function, the "WATER ON" light 29B on the control panel assembly 20 is illuminated.

In addition, the pressure pump 32 includes a pressurized water output port 34. The pressurized water output port 34 delivers the water, pressurized by the pressure pump 32, to the washer head assembly 50 via the pressurized waterhose 39. In a preferred embodiment, the output water pressure developed by the pressure pump 32 is approximately 1500 pounds per square inch (psi). Further, coupled between the main body of the pressure pump 32 and the pressurized water output port 34, are the output pressure control valve 35 and the output pressure gauge 36. The output pressure gauge 36 provides maintenance personnel with an indication of the output water pressure developed by the pressure pump 32.

The output pressure control valve 35 provides maintenance personnel with the ability to selectively adjust the output water pressure delivered to the washer head assembly 50.

Still further, the pressure pump 32 includes a high pressure bypass port 37. In the event that a malfunction condition occurs with respect to the apparatus 1, for instance, an obstruction (e.g., such as a clog or a kink) in the pressurized waterhose 39 or a similar obstruction at the washer head assembly 50, a relief valve (not shown) in the high pressure bypass port 37 will sense such a condition and subsequently open, thereby redirecting the flow of pressurized water through the bypass port 37, rather than to the pressurized water output port 34. In this way, any personnel in the vicinity of the apparatus 1 at the time of the malfunction are not threatened by the possibility of a stream of pressurized water being released at the point of the obstruction, or at any connection point between the pressure pump 32 and the washer head assembly 50, should the abnormal pressure caused by the obstruction not be relieved. In addition, the high pressure bypass port 37 preferably runs from the pressure pump 32 through the base 7 of the cart 2 such that, in the case of the occurrence of an above-described malfunction, the pressurized water will pass through the bypass port 37 and be directed under the cart 2. Accordingly, the pressurized water will be directed toward the floor of the facility thereby eliminating the possibility that any personnel will be injured while attempting to shut down the apparatus 1.

Similarly, the pressure pump 32 includes a low pressure bypass port 38. The low pressure bypass port 38 is mounted between the main body of the pump 32 and the pressurized water output port 34. In the event that the apparatus 1, and thus the pressure pump 32, is shut down, either manually or automatically as previously described, and the water supply from the facility input waterhose 16 is not turned off or the waterhose 16 is not detached from the apparatus 1, a relief valve (not shown) in the low pressure bypass port 38 will sense such an occurrence and subsequently open, thereby allowing the water flow from the facility input waterhose 16 to pass to the low pressure bypass port 38. A separate hose, such as a water bypass hose 18, is attached to the bypass port 38 in order to direct the water from the low pressure bypass port 38 back to the input port 33 of the pressure pump 32. In this way, when the pressure pump 32 is not operating, the water supplied by the facility is directed in a continuous loop between port 38 and port 33 thereby preventing any more water from being fed in from the facility input waterhose 16.

In a preferred embodiment of the apparatus 1, formed in accordance with the present invention, the electric motor 30, which drives the pressure pump 32, is a totally enclosed fan cooled (TEFC) wash down 5 horsepower motor. The preferred embodiment of the electric motor 30 also includes an internal thermal overload contact (not shown). The thermal overload contact opens when a predefined temperature is reached inside the electric motor 30, thereby disabling power to the electric motor 30, in turn, shutting down the pressure pump 32 and, thus, the entire cleaning operation of the apparatus 1. Additionally, when the electric motor 30 subsequently cools down below the predefined temperature, the thermal overload contact automatically resets such that the cleaning operation of the apparatus 1 can resume. It is to be appreciated that when the electric motor 30 is not in an overheated condition, the "MOTOR THERMAL SWT OK" light 29D, on the control panel assembly 20, is illuminated.

The cart-based equipment of the apparatus 1 also includes a pressurized air flow regulator assembly 40. The regulator assembly 40, in a preferred embodiment, is mounted on the second storing bracket 5 of the cart 2. The regulator assembly 40 includes a facility pressurized air input port 41 and a pressurized air output port 42. The facility pressurized air input port 41 of the regulator assembly 40 is releasably coupled to a facility input pressurized airhose 17. The facility input pressurized airhose 17, which is not an integral component of the present invention, provides the apparatus 1 with the requisite supply of pressurized air for the purpose of driving the mechanism used to rotate the spraying mechanism of the washer head assembly 50, which will be described in detail later. The regulator assembly 40 also includes a pressurized air output port 42. The pressurized air output port 42 is releasably coupled to the pressurized airhose 44, which delivers the pressurized air to the washer head assembly 50.

The regulator assembly 40 controls the passage of pressurized air from the facility source to the washer head assembly 50. Particularly, when the apparatus 1 is operating, the regulator assembly 40 is also in an operating state, thereby allowing the pressurized air to pass between the input port 41 and the output port 42. Conversely, when the apparatus 1 is not operating, the regulator assembly 40 is in a non-operating state, thereby preventing the passage of pressurized air therethrough. Internal to the regulator assembly 40, in a preferred embodiment, is a regulator valve (not shown) and a solenoid (not shown). The solenoid is responsive to the electric power provided by the control panel assembly 20 via electrical conduit 43. The regulator valve, in turn, is responsive to the solenoid. Specifically, when electric power is distributed to the components of the apparatus 1 from the control panel assembly 20, as previously described, the solenoid, reacting to the presence of electric power, causes the regulator valve to remain open in order to allow for the passage of pressurized air. Conversely, when electric power is not distributed to the components of the apparatus 1, for example, when the apparatus power disconnect switch 21 is in an off position or the illuminated start pushbutton switch 22 has not been depressed or electric power has been automatically disconnected for some reason, the solenoid, responding to the absence of electric power, causes the regulator valve to close, thereby preventing the passage of pressurized air therethrough.

It should be appreciated that, in an alternative embodiment, the above-described operation of the regulator assembly 40 may be similarly controlled by conventional digital logic circuitry, rather than by the solenoid arrangement described above. Further, it is to be appreciated that while the input pressurized air supply is preferably provided by the manufacturing facility, it is within the scope of the present invention to include an integral self-contained source of pressurized air which may be mounted on the cart 2 as part of the cart-based equipment, or on its own separate portable cart (not shown). Such a self-contained source of pressurized air may be in the form of an air compressor with sufficient capacity to provide pressurized air in order to perform the cleaning operation of the apparatus 1, independent of the manufacturing facility pressurized air supply.

Figure 5:
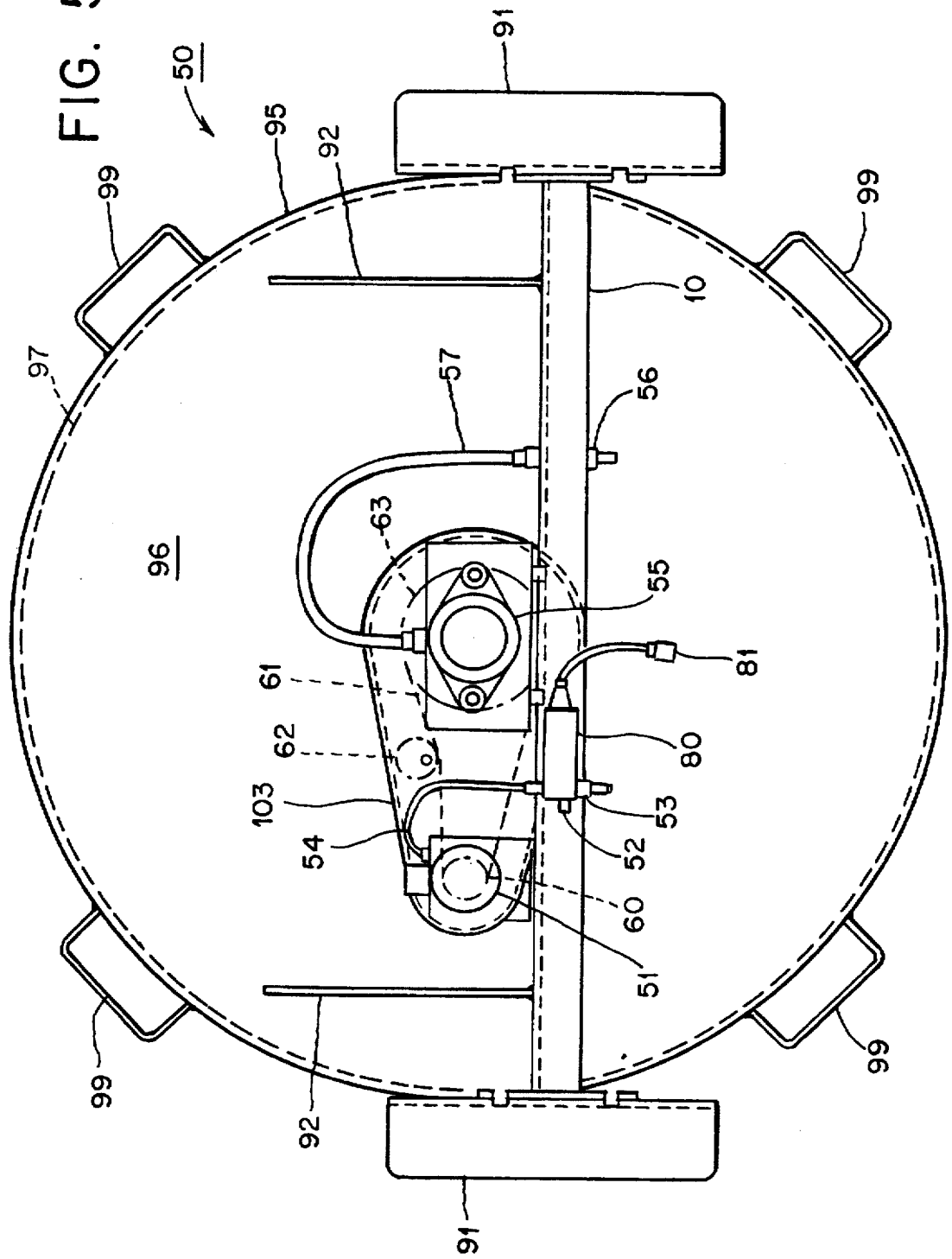
FIG. 5 is a top plan view of one embodiment of a washer head assembly formed in accordance with the present invention.
Figure 6:
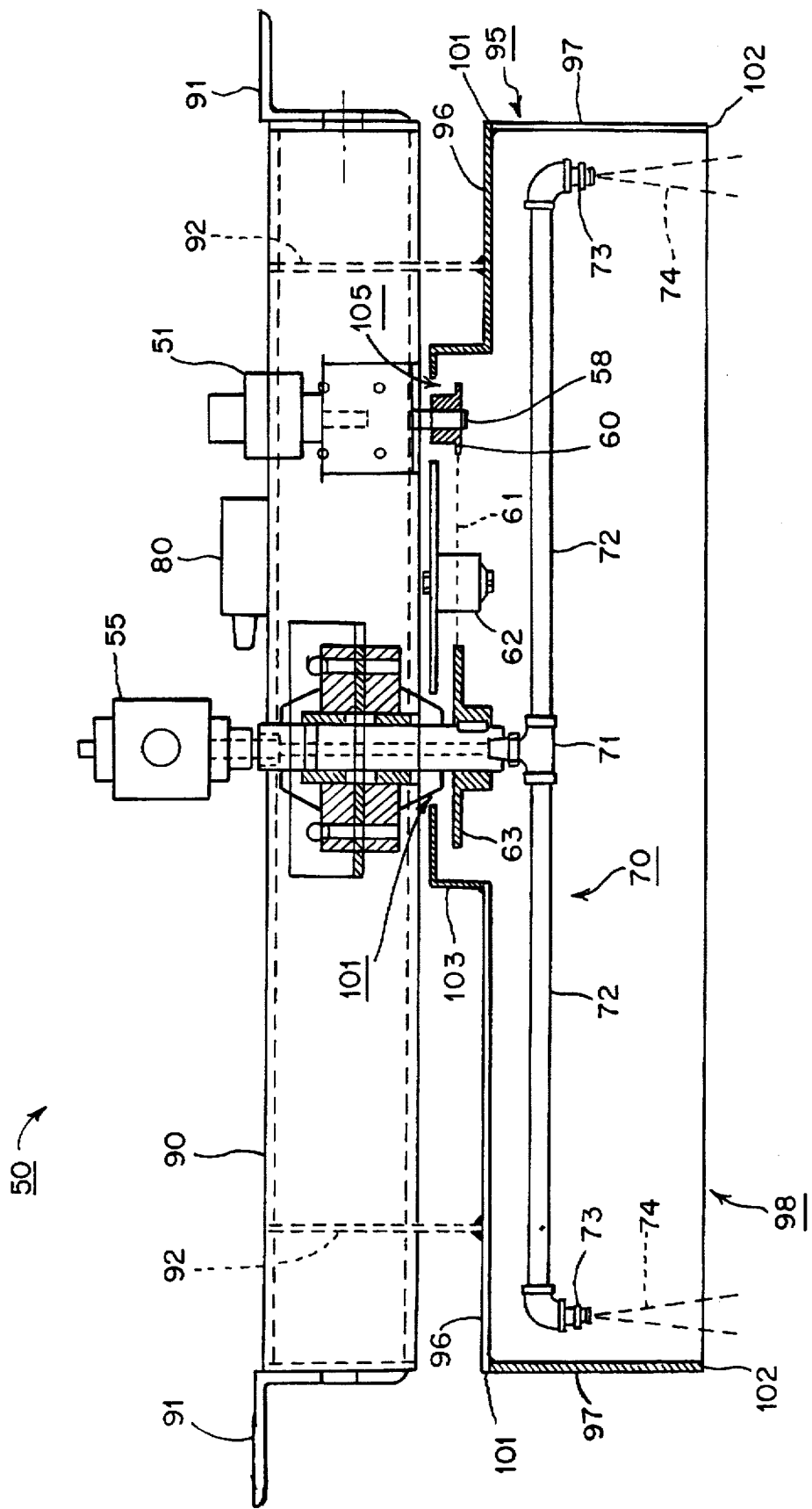
FIG. 6 is a cross sectional side view of one embodiment of a washer head assembly formed in accordance with the present invention.

Referring now to FIGS. 5 and 6, a preferred embodiment of the washer head assembly 50 is illustrated. Particularly, FIG. 5 is a top plan view of a washer head assembly 50 formed in accordance with the present invention, while FIG. 6 is a cross sectional side view of the washer head assembly 50 illustrated in FIG. 5. Similar to FIGS. 1–4, FIGS. 5 and 6 depict the washer head assembly 50 in a non-operating condition. Accordingly, the tilt-level sensor cable 28, the pressurized waterhose 39 and the pressurized airhose 44 of the cart-based equipment are not connected to the washer head assembly 50 and, thus, are not illustrated in FIGS. 5 and 6.

The washer head assembly 50 basically includes the following components: an air-driven motor 51, an air flow control valve 52, an intermediate airhose coupler 53 having a first port and a second port, an intermediate airhose 54 having a first end and a second end, a water union 55, an intermediate waterhose coupler 56 having a first port and a second port, an intermediate waterhose 57 having a first end and a second end, a first sprocket 60, a chain 61, a chain tensioner 62, a second sprocket 63, a dual spray arm member 70, a tilt-level sensor 80, a component mounting member 90, mounting brackets 91 and a protective cowl 95.

The main structural supporting member of the washer head assembly 50 is the component mounting member 90, the component mounting member 90 has a first end and a second end. The air-driven motor 51, the water union 55, the tilt-level sensor 80, the intermediate airhose coupler 53 and the intermediate waterhose coupler 56 are mounted on the component mounting member 90. In addition, the mounting brackets 91 are respectively connected to the ends of the component mounting member 90. The mounting brackets 91 engage the frame of the conveyor belt such that the washer head assembly 50 may be seated above the conveyor belt as the conveyor belt surface passes therebeneath. Further, the mounting brackets 91 may each have a slotted opening which aligns with a similar opening on the structure of the conveyor belt, such that the washer head assembly 50 may be secured with fasteners (e.g., bolt and nut, threaded screw, clip, etc.) to the conveyor belt during the cleaning operation. In this way, the washer head assembly 50 will remain firmly seated and level during the cleaning operation.

The intermediate waterhose coupler 56 is mounted on the component mounting member 90 and, as previously mentioned, has a first port and a second port. The first port of the coupler 56 is releasably coupled to the pressurized waterhose 39 of the cart-based equipment. The second port of the coupler 56 is releasably coupled to the first end of the intermediate waterhose 57, while the second end of the intermediate waterhose 57 is releasably coupled to the water union 55. It is to be appreciated that the pressurized waterhose 39 of the cart-based equipment may be releasably coupled directly to the water union 55; however, in order to reduce and/or eliminate coupling stress on the water union 55, the intermediate coupler 56 and intermediate waterhose 57, described above, are utilized in a preferred embodiment of the present invention.

The water union 55 is connected to the dual spray arm member 70. The dual spray arm member 70 includes a spray arm coupling joint 71, spray arms 72 and nozzles 73. Specifically, the water union 55 is coupled to the spray arm coupling joint 71. The spray arm coupling joint 71 also serves the purpose of coupling together the spray arms 72, whereby each spray arm 72 extends radially outward from the coupling joint 71. Each spray arm 72 terminates in a nozzle 73, each nozzle 73 being at approximately a 90 degree angle with respect to each spray arm 72. In this way, as will be described later with respect to the operation of the apparatus, the nozzles 73 direct water (or any other cleaning fluid) toward the surface of the conveyor belt. It is to be appreciated that while the preferred embodiment of the washer head assembly 50 includes two spray arms 72, each with a separate nozzle 73, it is within the scope of the present invention to include a greater or lesser number of spray arms, with each spray arm having its own nozzle or multiple nozzles. In addition, the present invention contemplates varying shapes for each spray arm 72, the particular shape being determined by the particular type of conveyor belt to be cleaned.

In the preferred embodiment of the washer head assembly 50 illustrated in FIG. 6, each nozzle 73 is in a fixed position on each spray arm 72 and, preferably, has a fixed spray angle range 74 of between approximately 15 degrees and approximately 20 degrees. It has been found that a nozzle having a spray angle within this range provides optimum cleaning results with respect to the vast majority of conveyor belt surfaces. However, it is to be appreciated that in an alternative embodiment the nozzles 73 may be selectively adjustable on the spray arms 72 in order to provide varying spray angle ranges. In this way, the nozzles 73 can be adjusted by maintenance personnel to maximize the cleaning operation of the apparatus 1 during the operation itself.

In a similar manner as the intermediate waterhose coupler 56, the intermediate airhose coupler 53 is also mounted on the component mounting member 90 and, as previously mentioned, has a first port and a second port. The first port of the coupler 53 is releasably coupled to the pressurized airhose 44 of the cart-based equipment. The second port of the coupler 53 is releasably coupled to the first end of the intermediate airhose 54, while the second end of the intermediate airhose 54 is releasably coupled to the air-driven motor 51. It is to be appreciated that the pressurized airhose 44 of the cart-based equipment may be releasably coupled directly to the air-driven motor 51; however, in order to reduce and/or eliminate coupling stress on the air-driven motor 51, the intermediate coupler 53 and intermediate airhose 54, described above, are utilized in a preferred embodiment of the present invention.

The air-driven motor 51 utilizes the pressurized air supplied from the cart-based equipment to provide a rotational driving force which rotates the dual spray arm member 70. In a preferred embodiment of the present invention, the air-driven motor 51 has an output drive shaft 58 attached thereto, which is responsive to the rotational driving force provided by the air-driven motor 51. Further, a first sprocket 60 is connected to the output drive shaft 58. The first sprocket 60 rotates as the output drive shaft 58 rotates, in response to the rotational driving force of the air-driven motor 51. Still further, a second sprocket 63 is connected between the water union 55 and the spray arm coupling joint 71, whereby the second sprocket 63 rotatably engages the water union 55 and fixedly engages the spray arm coupling joint 71. Next, a chain 61 is connected between and, thus, engages both the first sprocket 60 and the second sprocket 63. Accordingly, as the pressurized air drives the air-driven motor 51, the air-driven motor 51 generates the rotational driving force which causes the output drive shaft 58 to rotate. In turn, the first sprocket 60 rotates, thereby turning chain 61, which in turn causes the second sprocket 63 to rotate. The second sprocket 63, which is attached to the spray arm coupling joint 71, correspondingly causes the dual spray arm member 70 to rotate. A chain tensioner 62 is provided in a preferred embodiment in order to maintain tension on the chain 61 as the rotational driving force is translated from the air-driven motor 51 to the dual spray arm member 70.

It is to be appreciated that the present invention contemplates other conventional means of translating the rotational driving force from the air-driven motor 51 to the dual spray arm member 70. For instance, in an alternative embodiment, the rotational driving force may be translated by way of a first friction wheel being attached to the output drive shaft 58 and a second friction wheel being attached to the dual spray arm member 70, such that the first and second friction wheels directly engage one another thereby causing the translation of the rotational driving force. Likewise, in another alternative embodiment, a meshing gear arrangement may replace the above-described friction wheel approach. In still a further alternative embodiment, a belt and pulley arrangement may provide the same translation function, whereby a first and second pulley replace the first and second sprocket, 60 and 63, of the preferred embodiment, while a belt replaces the chain 61 of the preferred embodiment.

Further, the air-driven motor 51 is responsive to an air flow control valve 52. In a preferred embodiment, the air flow control valve 52 is mounted to the intermediate airhose coupler 53, in series with the air-driven motor 51. The air flow control valve 52, by controlling the pressurized air flow supplied to the air-driven motor 51, controls the speed with which the output drive shaft 58 of the air-driven motor 51 rotates. Accordingly, the air flow control valve 52, by controlling the air flow through the coupler 53 to the air-driven motor 51, thereby controls the rotational speed of the dual spray arm member 70. It is to be appreciated that such a speed control function is one of the key features of the present invention because the control valve 52 allows maintenance personnel to selectively adjust the speed at which the dual spray arm member 70 rotates. Such an adjustment feature is significant as it provides maintenance personnel with the ability to adjust the rotational speed of the dual spray arm member 70 during the cleaning operation in order to maximize the cleaning efficiency of the apparatus 1. In other words, the rotational speed of the dual spray arm member 70 may be adjusted in order to maximize the number of passes the dual spray arm member 70 makes over each section of the conveyor belt passing underneath. In this way, the conveyor belt cleaning operation may be advantageously adjusted to be responsive to the degree with which a conveyor belt is soiled.

As previously mentioned, the washer head assembly 50 also includes a tilt-level sensor 80. The tilt-level sensor 80 is mounted on the component mounting member 90. Further, the sensor 80 has an extended mating connector 81 which is releasably connected to the tilt-level sensor cable 28 of the cart-based equipment. Particularly, the control panel assembly 20 of the cart-based equipment provides electric power, in the form of a sensor signal, to the sensor 80 via the sensor cable 28. The tilt-level sensor 80 provides an interlock function whereby the sensor 80 is sensitive to whether or not it is in a level position or an unlevel position. The sensor 80 is, in effect, operatively connected to the apparatus power disconnect switch 21 much the same way as are the start pushbutton switch 22, the stop pushbutton switch 23 and the operation timer 24 of the control panel assembly 20, as previously described. In other words, the electromechanical relay (or digital logic circuitry), previously described, in the control panel assembly 20 is responsive to the sensor 80, that is, the sensor signal must be present for the relay to operate. Specifically, if the sensor 80 is in a level position the sensor signal provided by the control panel assembly 20 is returned to the relay via a return path provided by the tilt-level sensor cable 28. When the sensor signal is present, the relay contacts remain closed and electric power is distributed from the apparatus power disconnect switch 21 through the relay contacts to the components of the apparatus 1. In addition, the "LEVEL OK" light 29C on the control panel assembly 20 is illuminated. However, if the sensor 80 is in an unlevel position (i.e., not seated properly on the conveyor belt), than the sensor 80 does not return the sensor signal thereby deactuating the relay contacts and disabling electric power to the components of the apparatus 1. In such a condition, the light 29C is extinguished.

It is to be appreciated that the interlock function of the tilt-level sensor 80 is provided to protect maintenance personnel from being injured by the pressurized water which is discharged from the dual spray arm member 70 during the cleaning operation. Accordingly, if the washer head assembly 50 is not initially seated correctly (i.e., unlevel) on the conveyor belt or becomes unseated during operation, the sensor 80 will disable the sensor signal and thereby automatically shutdown the apparatus 1. In a preferred embodiment, the tilt-level sensor uses a mercury-based level to determine a level or unlevel condition.

Still further, in a preferred embodiment, the washer head assembly 50 includes a protective cowl 95. The protective cowl 95 includes cowl support brackets 92, a top wall 96 having a raised top wall portion 103, a continuous side wall 97 having an upper edge 101 and a lower edge 102, a bottom opening 98 being defined by the lower edge 102, and handles 99. Specifically, the protective cowl 95 is supported below the component mounting member 90 by cowl support brackets 92, the cowl support brackets 92 each having a first and second end. The cowl support brackets 92 are attached to the top wall 96 at their respective first ends and to the component mounting member 90 at their respective second ends. The top wall 96 is attached to the upper edge 101 of the continuous side wall 97. Further, as previously mentioned, the top wall 96 has a raised top wall portion 103. The raised top wall portion 103 has a first opening 104 and second opening 105 that allow both the water union 55 and the air-driven motor output drive shaft 58 of the air-driven motor 51 to pass therethrough. Specifically, the water union 55 passes through the protective cowl 95 through the first opening 104, while the air-driven motor 51 does the same through the second opening 105. Below the raised top wall portion 103 is housed the means for translating the rotational driving force of the air-driven motor 51 to the dual spray arm member 70, namely, the first sprocket 60, the second sprocket 63 and the chain 61. Also, attached to the bottom surface of the top wall portion 103 is the chain tensioner 62. Also, as previously mentioned, the lower edge of the continuous side wall 97 defines the bottom opening 98. The bottom opening 98 allows the water (or other cleaning fluid) discharged by the dual spray arm member 70 to be directed out of the bottom of the washer head assembly 50 but prevents the water discharged from the dual spray arm member 70 from being directed in a direction other than toward the conveyor belt.

In addition, the protective cowl 95 has handles 99 attached thereto. The handles 99 allow maintenance personnel to easily position the washer head assembly 50 above the conveyor belt prior to the commencement of the cleaning operation. While four handles are shown on the preferred embodiment of the washer head assembly 50 illustrated in FIG. 5, a greater or lesser number may be employed depending upon the shape and weight of alternative embodiments of the washer head assembly 50. It is to be appreciated that, in a preferred embodiment, the washer head assembly 50 weighs approximately 75 pounds.

Figure 7:
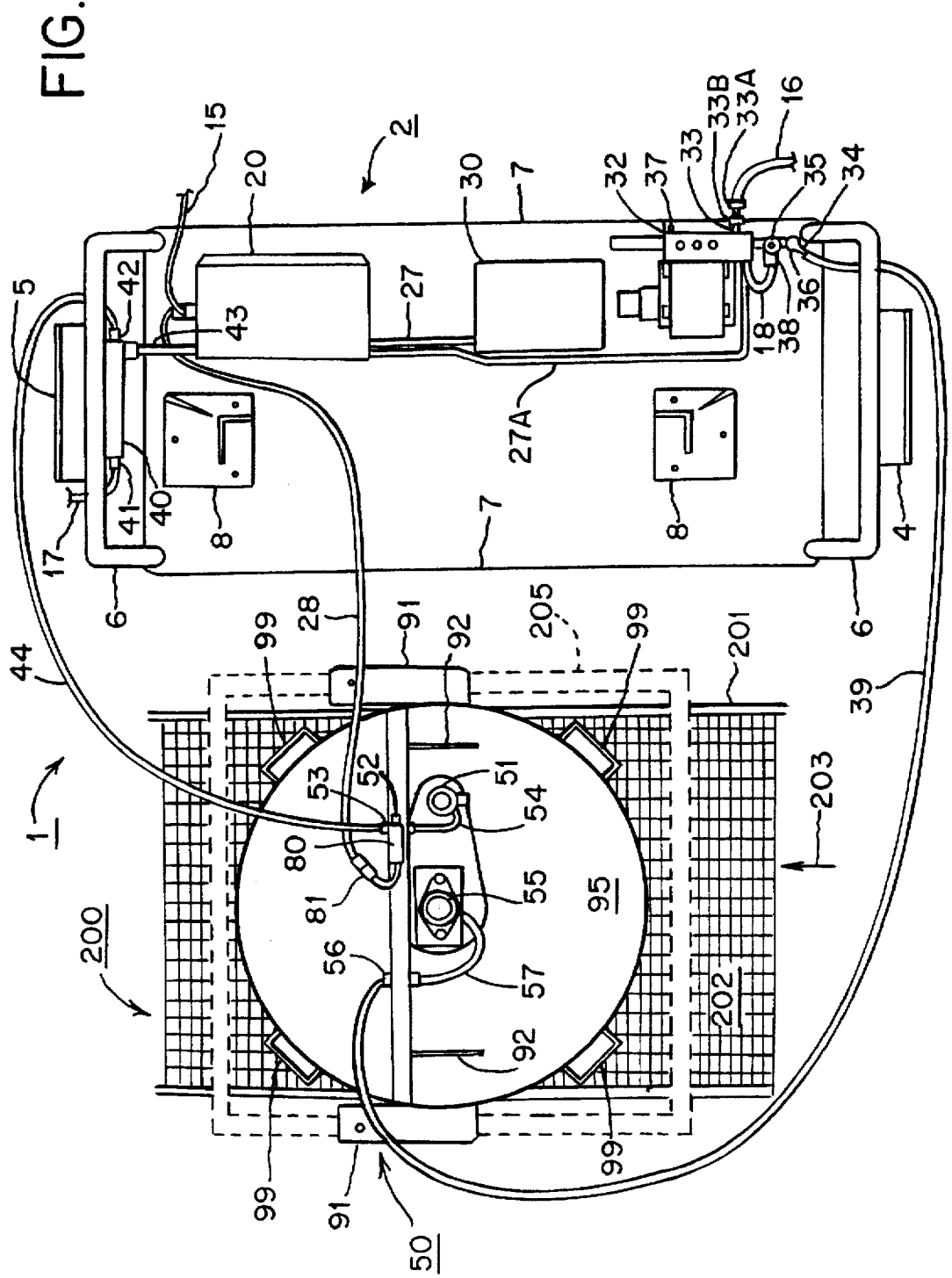
FIG. 7 is a top plan view of one embodiment of an apparatus for cleaning a conveyor belt, in an operating position, formed in accordance with the present invention.

Referring now to FIG. 7, the cleaning operation of the conveyor belt cleaning apparatus 1 will now be described. Specifically, FIG. 7 is a top plan view of one embodiment of an apparatus for cleaning a conveyor belt, in an operating position, formed in accordance with the present invention. It is to be understood that the following steps of positioning the apparatus 1 in order to perform the cleaning operation may be accomplished by maintenance personnel at the manufacturing facility. As FIG. 7 illustrates, the washer head assembly 50 is removed from the storing brackets 8 on the cart 2 and is removably mounted above a conveyor belt 200. Maintenance personnel may utilize the handles 99 on the washer head assembly 50 to lift and maneuver the washer head assembly 50 in order to position the washer head assembly 50 on the conveyor belt 200.

It is to be appreciated that conveyor belt 200 may be one of several conveyor belts located in a manufacturing plant, such as a baked goods manufacturing plant, that requires cleaning. The conveyor belt 200 preferably includes side walls 201 and surface 202. Particularly, the mounting brackets 91 of the washer head assembly 50 respectively rest on the side walls 201 of the conveyor belt 200. In this way, the washer head assembly 50 is removably positioned above the surface of the conveyor belt 200 such that the mounting brackets 91 are the only structural components of the washer head assembly 50 which come into contact with the conveyor belt 200.

It is also to be appreciated that if the conveyor belt 200 does not have side walls 201 which are sufficient to allow the direct mounting of the washer head assembly 50 thereupon, the present invention may optionally include a separate mounting member 205. The mounting member 205 straddles the surface 202 of the conveyor belt 200 such that the mounting brackets 91 of the washer head assembly 50 engage the mounting member 205 thereby allowing the washer head assembly 50 to be positioned above the conveyor belt 200 in order to allow the apparatus 1 to perform the cleaning operation. The mounting member 205 is depicted in FIG. 7 by dashed lines. The size and shape of the mounting member 205 depends upon the size and shape of the particular conveyor belt being cleaned. Therefore, because many different sizes and shapes of conveyor belts may be encountered, the present invention contemplates allowing the mounting member 205 to be reconfigurable, as needed, for each particular conveyor belt. Still further, it is to be understood that maintenance personnel may fasten the washer head assembly 50 to the side walls 201 of the conveyor belt 200, or to the mounting member 205, if used, via the previously-discussed slotted openings on the mounting brackets 91 of the washer head assembly 50.

Once the washer head assembly 50 is mounted on the conveyor belt 200, the tilt-level sensor cable 28, the pressurized waterhose 39 and the pressurized airhose 44 of the cart-based equipment are connected and/or coupled to the washer head assembly 50. Particularly, as previously mentioned, the tilt-level sensor cable 28 is releasable connected to the extended mating connector 81 of the tilt-level sensor 80, the pressurized waterhose 39 is releasably coupled to the intermediate waterhose coupler 56 and the pressurized airhose 44 is releasably coupled to the intermediate airhose coupler 53. It should be understood that the above-described connecting and/or coupling procedure may be performed while the washer head assembly 50 is still resting on the cart 2. In such a situation, maintenance personnel would removably mount the washer head assembly 50 on the conveyor belt 200, as discussed above, with the interconnecting cables and hoses already in place.

Next, maintenance personnel may proceed to make the necessary connections between the apparatus 1 and the manufacturing facility. Particularly, the facility input power cable 15 is releasably connected to the facility input power connector 25 of the control panel assembly 20, the facility input waterhose 16 is releasably coupled to the facility water input port 33 of the pressure pump 32 and the facility input pressurized airhose 17 is releasably coupled to the facility pressurized air input port 41 of the regulator assembly 40. As previously explained, the facility input power cable 15 supplies the electric power utilized by the apparatus 1, the facility input waterhose 16 supplies the water (or other cleaning fluid) utilized by the apparatus 1 and the facility input pressurized airhose 17 supplies the pressurized air utilized by the apparatus 1.

Once the facility connections are made and the washer head assembly 50 is in place and connected, the apparatus power disconnect switch 21 can be switched to the "on" position. Next, the adjustable operation timer 24 may be set to a desired predefined cleaning operation time. The setting of the timer 24 is dependent upon the condition of the conveyor belt 200. In other words, a longer cleaning operation time will be set if the conveyor belt surface 202 is particularly soiled, while a shorter time will be set if the conveyor belt surface 202 is not particularly soiled. Next, the lighted start pushbutton switch 22 is depressed, and as previously described, causes electric power to be applied to the apparatus 1 thereby beginning the cleaning operation.

Particularly, the regulator assembly 40, due to the application of electric power, transitions from its non-operating state to its operating state, thereby allowing the pressurized air from the facility to pass through the pressurized airhose 44, the intermediate airhose coupler 53, the selectively adjustable air flow control valve 52, and the intermediate airhose 54, to the air-driven motor 51. In turn, as previously described, the air-driven motor 51 causes the dual spray arm member 70 to rotate at a particular rotating speed. Simultaneously, upon depression of the lighted start pushbutton switch 22, electric power is applied to the electric motor 30 which drives the pressure pump 32. The pressure pump 32 pressurizes the water provided by the facility and supplies the pressurized water through the pressurized waterhose 39, the intermediate waterhose coupler 56 and the intermediate waterhose 57, to the water union 55. The pressurized water passes through the water union 55, through the spray arm coupling joint 71, through each spray arm 72, to each nozzle 73, where it is forcibly discharged toward the conveyor belt surface 202. It is to be appreciated that the entire dual spray arm member 70 rotates above the conveyor belt surface 202, in response to the rotational driving force of the air-driven motor 51, as the pressurized water passes therethrough. As previously explained, so long as the sensor signal from the tilt-level sensor 80 is not interrupted, the ground fault detectors do not detect a leakage current level above the predefined current level, the water pressure switch 33B does not detect an absence of water, or the stop pushbutton switch 23 is not depressed, the apparatus 1 will continue to perform its cleaning operation until the operation timer 24 times out.

While the apparatus 1 is operating, maintenance personnel can adjust the air pressure at the washer head assembly 50 and, thus, the rotational speed of the dual spray arm member 70. It is to be appreciated that control of the air pressure is accomplished by adjusting the air flow control valve 52. In this way, the speed of the rotating dual spray arm member 70 can be advantageously adjusted. A direction of movement of the conveyor belt surface 202 is illustrated in FIG. 7 by directional arrow 203; however, it is to be understood that the apparatus 1 of the present invention accomplishes its cleaning operation whether the conveyor belt is moving in the direction illustrated in FIG. 7 or in an opposite direction. In a preferred cleaning operation, the rotational speed of the dual spray arm member 70 is adjusted such that the dual spray arm member 70 makes two full passes over each section of the conveyor belt surface 202 moving beneath the washer head assembly 50. Such speed adjustment results in the dual spray arm member 70, in a preferred embodiment, rotating at a speed of between approximately 60 revolutions per minute (rpm) and approximately 90 rpm. Likewise, in a preferred cleaning operation for a moderately soiled conveyor belt, the conveyor belt surface should make two complete passes under the washer head assembly 50, while a very soiled belt should make three complete passes thereunder. While the air pressure and, thus, the rotating speed of the dual spray arm member 70, is adjustable, the preferred initial air pressure provided by the facility to the regulator assembly 40 is approximately 95 pounds per square inch (psi).

In addition, although the conveyor belt cleaning apparatus 1 may be used with conveyor belts having various surface configurations (e.g., single, flat surface), the apparatus 1 of the present invention is preferably utilized with a conveyor belt having multiple surfaces, such as a conveyor belt of the chain link variety. It is to be appreciated that such a conveyor belt not only has a top surface but, in addition, such a conveyor belt is constructed of interconnected chain link members whereby each chain link member has at least a front-side surface and a rear-side surface. The side surfaces are perpendicularly positioned with respect to the top surface. In the manufacturing of baked goods and similar food products, it is to be understood that all of these surfaces may become soiled and, thus, require cleaning. The spraying motion of the dual spray arm member 70 permits thorough cleaning of all such multiple surfaces. For instance, the advantageous cleaning motion may be understood more clearly by focusing on the motion of one of the nozzles 73 of the dual spray arm member 70. Whether the motion of the dual spray arm member 70 is in a clockwise or counter-clockwise direction (the present invention contemplates the motion of the dual spray arm member 70 in either direction), it is to be appreciated that the multiple surfaces of the chain link type conveyor belt are exposed to the cleaning force of the water sprayed by the nozzle 73, not only each time the nozzle 73 passes over that particular section of the conveyor belt (e.g., twice in a preferred cleaning operation), but also each rotational pass the conveyor belt makes under the washer head assembly 50 (e.g., two to three passes depending on the condition of the belt).

Further, the water pressure delivered by the apparatus 1 can be adjusted by maintenance personnel during the cleaning operation and, thus, the water consumption of the apparatus 1. This is accomplished via the output pressure control valve 35 on the pressure pump 32 of the cart-based equipment. In this way, the water (or cleaning fluid) utilized during the cleaning operation may be controlled. As previously mentioned, prior art conveyor belt cleaning methods can consume upwards of 50 gallons of water per minute during the cleaning process; however, in a preferred embodiment of the present invention, the pressure pump 32 has a maximum water consumption of approximately 4.7 gallons per minute. Accordingly, the output pressure control valve 35 of the pressure pump 32 allows maintenance personnel to lower the pressure and thereby lower the water consumption of the apparatus 1. Thus, as compared to prior art cleaning methods which, even at full water consumption levels, are ineffective, the present invention performs a thorough cleaning operation utilizing approximately 4.7 gallons of water per minute or less, depending upon the setting of the output pressure control valve 35.

As an example of the cleaning efficiency of a conveyor belt cleaning apparatus 1 formed in accordance with the present invention, it is to be appreciated that a 1500 foot conveyor belt may be cleaned in approximately 2.5 hours while consuming approximately 705 gallons of water. In this particular example, the conveyor belt surfaces are cleaned in three passes or less, depending on the condition of the soiled conveyor belt.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. Apparatus for cleaning a conveyor belt, the conveyor belt having at least one surface, the apparatus being responsive to a source of cleaning fluid and a source of pressurized air and the apparatus being electrically powered by a source of electric power, the apparatus comprising:

a washer head assembly, the washer head assembly being removably mountable above the conveyor belt, the washer head assembly including means for spraying the cleaning fluid onto the at least one surface of the conveyor belt, the spraying means being responsive to the source of cleaning fluid, the washer head assembly also including means for rotating the spraying means, the rotating means being operatively coupled to the spraying means, the rotating means being responsive to the source of pressurized air and further including means for selectively adjusting the speed of rotation of the spraying means;

cart-based equipment, the cart-based equipment including:

means for pressurizing the cleaning fluid prior to the cleaning fluid being supplied to the spraying means of the washer head assembly, the pressurizing means being releasably coupled to the source of the cleaning fluid;

means for controlling the pressurized air prior to the pressurized air being supplied to the rotating means of the washer head assembly, the controlling means being releasably coupled to the source of the pressurized air;

first coupling means, the first coupling means releasably coupling the pressurizing means of the cart-based equipment and the spraying means of the washer head assembly; and second coupling means, the second coupling means releasably coupling the controlling means of the cart-based equipment and the rotating means of the washer head assembly; and a cart, the cart portably supporting the cart-based equipment;

wherein the washer head assembly is removably mounted above the conveyor belt in order to provide the pressurized cleaning fluid to the conveyor belt.

2. Apparatus for cleaning a conveyor belt as defined in claim 1, wherein the rotating means of the washer head assembly comprises:

an air-driven motor, the air-driven motor being operatively coupled to the second coupling means of the cart-based equipment, the air-driven motor being driven by the source of pressurized air passing through each of the controlling means and the second coupling means of the cart-based equipment, the air-driven motor providing a rotational driving force; and means for translating the rotational driving force of the air-driven motor to the spraying means, the translating means being connected between the air-driven motor and the spraying means.

3. Apparatus for cleaning a conveyor belt as defined in claim 2, wherein the translating means includes a first sprocket, a second sprocket and a chain, the first sprocket being connected to the air-driven motor, the second sprocket being connected to the spraying means, the chain being coupled between the first and second sprockets, whereby the rotational driving force of the air-driven motor causes the first sprocket to rotate, in turn rotating the chain, in turn rotating the second sprocket, and in turn causing the spraying means to correspondingly rotate.

4. Apparatus for cleaning a conveyor belt as defined in claim 3, wherein the translating means further includes a chain tensioner, the chain tensioner engaging the chain thereby maintaining a tension in the chain as the chain rotates around the first and second sprockets.

5. Apparatus for cleaning a conveyor belt as defined in claim 2, wherein the rotating means further includes:

an intermediate coupler, the intermediate coupler having a first port and a second port, the intermediate coupler being fixedly mounted on the washer head assembly; and an intermediate hose, the intermediate hose having a first end and a second end, the first end being releasably coupled to the air-driven motor and the second end being releasably coupled to the first port of the intermediate coupler;

whereby the second coupling means is releasably coupled to the second port of the intermediate coupler in order to substantially reduce coupling stress on the air-driven motor.

6. Apparatus for cleaning a conveyor belt as defined in claim 1, wherein the adjusting means of the rotating means includes a selectively adjustable speed control device, the speed control device being mounted on the rotating means, the speed control device controlling a rotational speed associated with the spraying means.

7. Apparatus for cleaning a conveyor belt as defined in claim 1, wherein the washer head assembly further includes means for automatically disconnecting the electric power to the apparatus, the washer head assembly automatic power disconnect means being operatively connected to the source of the electric power, the washer head assembly automatic power disconnect means being mounted on the washer head assembly and being responsive to the washer head assembly being situated in one of a level position and an unlevel position.

8. Apparatus for cleaning a conveyor belt as defined in claim 7, wherein the washer head assembly automatic power disconnect means includes a mercury tilt-level sensor.

9. Apparatus for cleaning a conveyor belt as defined in claim 1, wherein the spraying means comprises:

a cleaning fluid union, the union being operatively coupled to the first coupling means of the cart-based equipment, the union allowing the pressurized cleaning fluid to pass therethrough; and at least one spray arm member, the at least one spray arm member being coupled to the cleaning fluid union, the at least one spray arm member also having at least one nozzle attached thereto, the at least one nozzle discharging the pressurized cleaning fluid, provided through the cleaning fluid union and through the at least one spray arm member to the at least one nozzle, in the direction of the at least one surface of the conveyor belt.

10. Apparatus for cleaning a conveyor belt as defined in claim 9, wherein the at least one nozzle is adjustably mounted on the at least one spray arm member thereby providing a varying spray angle.

11. Apparatus for cleaning a conveyor belt as defined in claim 9, wherein the at least one nozzle is fixedly mounted on the at least one spray arm member and has a fixed spray angle range of between approximately fifteen degrees and approximately twenty degrees.

12. Apparatus for cleaning a conveyor belt as defined in claim 9, wherein the spraying means further includes:
   an intermediate coupler, the intermediate coupler having a first port and a second port, the intermediate coupler being fixedly mounted on the washer head assembly; and
   an intermediate hose, the intermediate hose having a first end and a second end, the first end being releasably coupled to the cleaning fluid union and the second end being releasably coupled to the first port of the intermediate coupler;
   whereby the first coupling means is releasably coupled to the second port of the intermediate coupler in order to substantially reduce coupling stress on the cleaning fluid union.

13. Apparatus for cleaning a conveyor belt as defined in claim 1, wherein the cart-based equipment further includes a control panel assembly, the control panel assembly controlling the operation of the apparatus.

14. Apparatus for cleaning a conveyor belt as defined in claim 13, wherein the control panel assembly includes means for selectively applying the electric power to the apparatus, the power applying means being operatively connected to the source of the electric power.

15. Apparatus for cleaning a conveyor belt as defined in claim 14, wherein the power applying means includes at least one disconnect switch.

16. Apparatus for cleaning a conveyor belt as defined in claim 13, wherein the control panel assembly further includes means for selectively starting the cleaning operation of the apparatus, the selective starting means being operatively connected to the source of the electric power.

17. Apparatus for cleaning a conveyor belt as defined in claim 16, wherein the selective starting means includes a pushbutton switch.

18. Apparatus for cleaning a conveyor belt as defined in claim 13, wherein the control panel assembly further includes means for selectively stopping the cleaning operation of the apparatus, the selective stopping means being operatively connected to the source of the electric power.

19. Apparatus for cleaning a conveyor belt as defined in claim 18, wherein the selective stopping means includes a pushbutton switch.

20. Apparatus for cleaning a conveyor belt as defined in claim 13, wherein the control panel assembly further includes an indicator, the indicator providing an indication that the electric power is applied to the apparatus and that the apparatus is currently operating, the indicator being operatively connected to the source of the electric power.

21. Apparatus for cleaning a conveyor belt as defined in claim 20, wherein the indicator is a lamp, the lamp being lit when the electric power is applied to the apparatus and the apparatus is currently operating.

22. Apparatus for cleaning a conveyor belt as defined in claim 13, wherein the control panel assembly further includes means for selectively setting a maximum operation time, the maximum operation time corresponding to the operation of the apparatus, the maximum operation time setting means being operatively connected to the source of the electric power.

23. Apparatus for cleaning a conveyor belt as defined in claim 22, wherein the maximum operation time setting means includes an adjustable operation timer, whereby the adjustable operation timer automatically disconnects the electric power to the apparatus when the maximum operation time has been reached.

24. Apparatus for cleaning a conveyor belt as defined in claim 13, wherein the control panel assembly further includes means for automatically disconnecting the electric power to the apparatus, the control panel assembly automatic power disconnect means being responsive to a predefined current leakage level to ground, the control panel assembly automatic power disconnect means being operatively connected to the source of the electric power.

25. Apparatus for cleaning a conveyor belt as defined in claim 24, wherein the control panel assembly automatic power disconnect means includes at least one ground fault detector.

26. Apparatus for cleaning a conveyor belt as defined in claim 1, wherein means for pressurizing the cleaning fluid prior to the cleaning fluid being supplied to the spraying means comprises:
   an electric motor, the electric motor being operatively connected to the source of electric power; and
   a pressure pump, the pressure pump being operatively coupled to, and driven by, the electric motor, the pressure pump having at least a first input port and at least a first output port, the at least a first input port being releasably coupled to the source of cleaning fluid, the at least a first output port being releasably coupled to the first coupling means of the cart-based equipment, the pressure pump pressurizing the cleaning fluid, as the cleaning fluid passes therethrough, prior to the cleaning fluid being supplied to the spraying means of the washer head assembly.

27. Apparatus for cleaning a conveyor belt as defined in claim 26, wherein the pressure pump pressurizes the cleaning fluid in order to develop an output pressure of approximately 1500 pounds per square inch.

28. Apparatus for cleaning a conveyor belt as defined in claim 26, wherein the pressure pump further includes an output pressure control valve, the output pressure control valve being mounted on the pressure pump and providing for selective adjustment of an output pressure associated with the cleaning fluid supplied to the spraying means.

29. Apparatus for cleaning a conveyor belt as defined in claim 26, wherein the pressure pump includes a high pressure bypass port, whereby the cleaning fluid, subsequent to being pressurized, is discharged from the pressure pump through the high pressure bypass port when the apparatus experiences at least one of a first plurality of malfunction conditions.

30. Apparatus for cleaning a conveyor belt as defined in claim 26, wherein the pressure pump includes a low pressure bypass port, whereby the cleaning fluid, prior to being pressurized, is discharged from the pressure pump through the low pressure bypass port when the apparatus experiences at least one of a second plurality of malfunction conditions.

31. Apparatus for cleaning a conveyor belt as defined in claim 26, wherein the pressure pump includes a filter, the filter being coupled to the at least first input port, the filter preventing foreign particles, present in the cleaning fluid supplied by the source, from entering the pump.

32. Apparatus for cleaning a conveyor belt as defined in claim 1, wherein the means for controlling the rotating means includes a regulator assembly, the regulator assembly having at least one input port and at least one output port, the at least one input port being releasably coupled to the source of pressurized air, the at least one output port being releasably coupled to the second coupling means of the cart-based equipment, the regulator assembly being responsive to the source of electric power, the regulator assembly being in one of an operating state and a non-operating state, the operating state and the non-operating state occurring in respective response to the presence and absence of electric power at the regulator assembly, the regulator assembly allowing pressurized air to pass therethrough while in the operating state and preventing pressurized air from passing therethrough while in the non-operating state.

33. Apparatus for cleaning a conveyor belt as defined in claim 32, wherein the regulator assembly further includes a filter, the filter preventing foreign particles, present in the pressurized air supplied by the source, from passing through the regulator assembly to the rotating means of the washer head assembly.

34. Apparatus for cleaning a conveyor belt as defined in claim 1, wherein the first coupling means of the cart-based equipment includes a flexible hose, the flexible hose having a first end and a second end and connectors, fitted at each end, for releasably coupling the flexible hose between the pressurizing means and the spraying means.

35. Apparatus for cleaning a conveyor belt as defined in claim 1, wherein the second coupling means of the cart-based equipment includes a flexible hose, the flexible hose having a first end and a second end and connectors, fitted at each end, for releasably coupling the flexible hose between the controlling means and the rotating means.

36. Apparatus for cleaning a conveyor belt as defined in claim 1, wherein the cart includes means for storing the first connecting means when the apparatus is not in use.

37. Apparatus for cleaning a conveyor belt as defined in claim 1, wherein the cart includes means for storing the second connecting means when the apparatus is not in use.

38. Apparatus for cleaning a conveyor belt as defined in claim 1, wherein the cart includes means for storing the washer head assembly when the apparatus is not in use.

39. Apparatus for cleaning a conveyor belt as defined in claim 1, wherein the washer head assembly further includes a protective cowl, the cowl having a top wall, a continuous side wall and a bottom opening, the continuous side wall having an upper edge and a lower edge, the upper edge being attached to the top wall, the lower edge defining the bottom opening of the cowl, the cowl allowing cleaning fluid to be sprayed out of the bottom opening of the cowl by the spraying means but preventing the cleaning fluid sprayed by the spraying means from being directed in a direction other than towards the at least one surface of the conveyor belt.

40. Apparatus for cleaning a conveyor belt as defined in claim 1, wherein the washer head assembly further includes a pair of mounting brackets, the pair of mounting brackets being fixedly attached to the washer head assembly, the pair of mounting brackets engaging the conveyor belt such that the washer head assembly may be removably mounted thereabove while allowing the conveyor belt to move beneath the washer head assembly.

41. Apparatus for cleaning a conveyor belt as defined in claim 1, wherein the cleaning fluid is water.

42. Apparatus for cleaning a conveyor belt as defined in claim 1, wherein the means for pressurizing the cleaning fluid further includes means for automatically disconnecting the electric power to the apparatus, the automatic power disconnect means being operatively connected to the source of electric power and mounted between the source of cleaning fluid and the pressurizing means, the automatic power disconnect means being responsive to the presence of cleaning fluid supplied by the source of cleaning fluid.

43. Apparatus for cleaning a conveyor belt as defined in claim 42, wherein the automatic power disconnect means includes a water pressure switch.

44. Apparatus for cleaning a conveyor belt, the conveyor belt having at least one surface, the apparatus being responsive to a source of cleaning fluid and a source of pressurized air and the apparatus being electrically powered by a source of electric power, the apparatus comprising:

a washer head assembly, the washer head assembly being removably mountable above the conveyor belt, the washer head assembly including:
  a cleaning fluid union;
  a dual spray arm member, the dual spray arm member being coupled to the cleaning fluid union, the dual spray arm member having two spray arms, each spray arm extending radially outward from the coupling with the cleaning fluid union, each spray arm having an outer end with a nozzle attached thereto, the nozzle of each spray arm pointing in a direction substantially toward the at least one surface of the conveyor belt, the dual spray arm member further having a first sprocket attached thereto;
  an air-driven motor, the air-driven motor being responsive to the source of pressurized air and providing a rotational driving force, the air-driven motor further having a second sprocket attached thereto;
  a selectively adjustable air flow control valve for controlling the rotational driving force of the air-driven motor, the air flow control valve being operatively coupled between the source of pressurized air and the air-driven motor;
  a chain, the chain engaging the first sprocket of the dual spray arm member and the second sprocket of the air-driven motor, whereby the rotational driving force of the air-driven motor causes the second sprocket to rotate, in turn rotating the chain, in turn rotating the first sprocket, in turn causing the dual spray arm member to correspondingly rotate; and
  a tilt-level sensor, the tilt-level sensor being operatively connected to the source of electric power, the tilt-level sensor being responsive to the washer head assembly being in one of a level position and an unlevel position, the tilt-level sensor automatically disconnecting the source of electric power to the apparatus when the washer head assembly is in the unlevel position;

cart-based equipment, the cart-based equipment including:
  a control panel assembly, the control panel assembly being releasably connected to the source of electric power, the control panel assembly controlling the operation of the apparatus and including:
    a disconnect switch, the disconnect switch being electrically connected to the source of electric power, the disconnect switch selectively applying electric power to the apparatus;
    a start pushbutton switch, the start pushbutton being operatively connected to the disconnect switch, the start pushbutton switch selectively starting the cleaning operation of the apparatus, the start pushbutton switch also including a lamp, the lamp being lit when electric power is applied to the apparatus and the apparatus is currently operating;
    a stop pushbutton switch, the stop pushbutton being operatively connected to the disconnect switch, the stop pushbutton switch selectively stopping the cleaning operation of the apparatus; and a selectively adjustable operation timer, the operation timer being operatively connected to the disconnect switch, the operation timer allowing a maximum operation time, corresponding to the operation of the apparatus, to be set, the operation timer automatically disconnecting electric power to the apparatus when the maximum operation time has been reached;

a set of diagnostic indicator lights, the lights being mounted on the control panel assembly and providing an operation status of the apparatus;

the cart-based equipment further including:

an electric motor, the electric motor being operatively connected to the control panel assembly and being responsive to the electric power provided therefrom;

a pressure pump, the pump being operatively coupled to, and driven by, the electric motor, the pressure pump having at least a first input port and at least a first output port, the at least a first input port being releasably coupled to the source of cleaning fluid, the pump pressurizing the cleaning fluid, as the cleaning fluid passes therethrough, the pressure pump also including a pressure switch, the pressure switch being operatively coupled to the at least a first input port and automatically disconnecting the source of electric power to the apparatus when the pressure switch detects the absence of cleaning fluid being supplied by the source;

a regulator assembly, the regulator assembly having at least one input port and at least one output port, the at least one input port being releasably coupled to the source of pressurized air, the regulator assembly being responsive to the source of electric power, the regulator assembly being in one of an operating state and a non-operating state, the operating state and the non-operating state occurring in respective response to the presence and absence of electric power at the regulator assembly, the regulator assembly allowing pressurized air to pass therethrough while in the operating state and preventing pressurized air from passing therethrough while in the non-operating state;

a first flexible hose for carrying the pressurized cleaning fluid, the first flexible hose having a first end and a second end and connectors, fitted at each end, the connector fitted at the first end being releasably coupled to the at least first output port of the pressure pump of the cart-based equipment, the connector fitted at the second end being releasably coupled to the cleaning fluid union of the washer head assembly;

a second flexible hose for carrying the pressurized air, the second flexible hose having a first end and a second end and connectors, fitted at each end, the connector fitted at the first end being releasably coupled to the at least one output port of the regulator assembly of the cart-based equipment, the connector fitted at the second end being releasably coupled to the air-driven motor of the washer head assembly; and an electric cable, the electric cable having a first end and a second end, the first end being releasably connected to the control panel assembly of the cart-based equipment and the second end being releasably connected to the tilt-level sensor of the washer head assembly; and a cart, the cart portably supporting the cart-based equipment;

wherein the washer head assembly is removably mounted above the conveyor belt, electric power is applied to the apparatus via the disconnect switch and the apparatus is placed in an operating condition via the start pushbutton switch thereby allowing the pressure pump to provide pressurized cleaning fluid to the dual spray arm member of the washer head assembly and placing the regulator assembly in an operating state allowing pressurized air to pass therethrough to the air-driven motor of the washer head assembly, the air-driven motor causing the dual spray arm member to rotate, the nozzles of the dual spray arm member delivering the pressurized cleaning fluid to the at least one surface of the conveyor belt, and the selectively adjustable air flow control valve being selectively adjusted in order to control the rotational driving force of the air-driven motor thereby adjusting the rotational speed of the dual spray arm member.

45. A method of cleaning a conveyor belt, the conveyor belt having at least one surface, the method utilizing a conveyor belt cleaning apparatus, the apparatus being responsive to a source of cleaning fluid and a source of pressurized air and the apparatus being electrically powered by a source of electric power, the apparatus including a washer head assembly, cart-based equipment and a cart, the washer head assembly including means for spraying the cleaning fluid onto the at least one surface of the conveyor belt, the washer head assembly also including means for rotating the spraying means, the cart-based equipment including means for pressurizing the cleaning fluid prior to the cleaning fluid being supplied to the spraying means, the cart portably transporting the cart-based equipment and the washer head assembly being removably mounted above the conveyor belt, the method comprising:

supplying cleaning fluid to the pressurizing means of the cart-based equipment;

pressurizing the cleaning fluid via the pressurizing means of the cart-based equipment;

supplying the pressurized cleaning fluid to the spraying means of the washer head assembly;

supplying pressurized air to the rotating means of the washer head assembly in order to generate a rotational driving force;

translating the rotational driving force of the rotating means to the spraying means of the washer head assembly thereby causing the spraying means to correspondingly rotate;

spraying the pressurized cleaning fluid onto the at least one surface of the conveyor belt as the conveyor belt moves therebeneath; and adjusting the rotational speed of the spraying means.

46. A method of cleaning a conveyor belt as defined in claim 45, further comprising the step of:

automatically disconnecting the electric power to the conveyor belt cleaning apparatus if the washer head assembly, mounted above the conveyor belt, becomes unlevel.

* * * * *